United States Patent
Shimazaki et al.

(10) Patent No.: US 6,647,325 B2
(45) Date of Patent: Nov. 11, 2003

(54) CONTROL SYSTEM FOR ELECTRIC MOTOR FOR DRIVING ELECTRIC VEHICLE

(75) Inventors: Mitsuyoshi Shimazaki, Numazu (JP); Yutaka Inaba, Nunazu (JP)

(73) Assignee: Kokusan Denki Co., Ltd., Numazu (JP)

( * ) Notice: Subject to any disclaimer, the term of this patent is extended or adjusted under 35 U.S.C. 154(b) by 0 days.

(21) Appl. No.: 10/078,185

(22) Filed: Feb. 19, 2002

(65) Prior Publication Data
US 2002/0116100 A1 Aug. 22, 2002

(30) Foreign Application Priority Data
Feb. 19, 2001 (JP) ........................................ 2001-041985
Mar. 15, 2001 (JP) ........................................ 2001-073857

(51) Int. Cl.[7] .............................................. B60L 11/00
(52) U.S. Cl. ..................... 701/22; 180/65.1; 180/65.8
(58) Field of Search ........................... 701/22; 180/65.1, 180/65.8

(56) References Cited

U.S. PATENT DOCUMENTS

| 3,903,456 | A | * | 9/1975 | Schaefer ..................... 361/24 |
|---|---|---|---|---|
| 4,022,598 | A | * | 5/1977 | Gucwa et al. ................. 62/164 |
| 4,121,140 | A | * | 10/1978 | Jones ......................... 318/751 |
| 5,541,494 | A | * | 7/1996 | Sannomiya et al. .......... 318/801 |
| 5,923,135 | A | * | 7/1999 | Takeda ........................ 318/432 |
| 5,936,820 | A | * | 8/1999 | Umemura et al. ............ 361/103 |
| 6,100,660 | A | * | 8/2000 | Ikeyama et al. .............. 318/473 |
| 6,114,828 | A | * | 9/2000 | Matsunaga et al. .......... 318/782 |
| 6,222,333 | B1 | | 4/2001 | Garnett et al. |

FOREIGN PATENT DOCUMENTS

| DE | 3128303 A1 | * | 2/1983 | ............ H02H/5/04 |
|---|---|---|---|---|
| JP | 08-265919 | | 10/1996 | |
| JP | 09056182 A | * | 2/1997 | ............ H02P/3/18 |
| JP | 2000184771 A | * | 6/2000 | ............ H02P/6/12 |

* cited by examiner

Primary Examiner—Michael J. Zanelli
Assistant Examiner—Eric Gibson
(74) Attorney, Agent, or Firm—Pearne & Gordon LLP

(57) ABSTRACT

A control system for an electric motor for driving an electric vehicle comprising lock state judgment means to judge that the electric motor is in a lock state when a state where a rotational speed of a brushless DC motor has a value equal to or less than a set lock start rotational speed while an opening degree of an accelerator is equal to or more than a predetermined judgment opening degree continues during predetermined judgment time and lock time drive current control means to perform such a control as to gradually reduce a drive current of the motor to a lock-time limit value. Thus, when the rotational speed of the vehicle is lowered until the motor gets the lock state while the vehicle is driven in the state where the accelerator is opened with the opening degree being equal to or more than the judgment opening degree, the drive current is decreased whereby a temperature of armature coils is prevented from abnormally rising.

9 Claims, 8 Drawing Sheets

Fig.6A  Hu
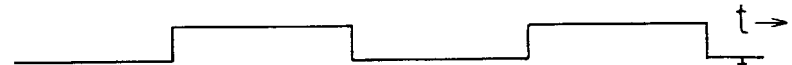
Fig.6B  Hv
Fig.6C  Hw
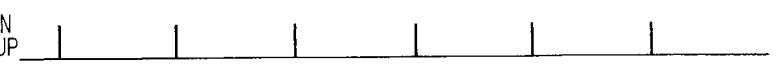
Fig.6D  PATTERN RISING UP
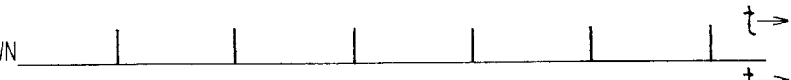
Fig.6E  PATTERN FALLING DOWN
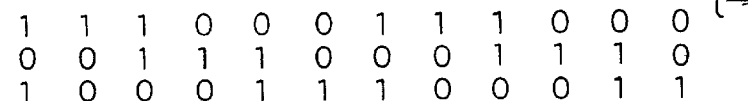
Fig.6F
Fig.7A  Hu
Fig.7B  Hv
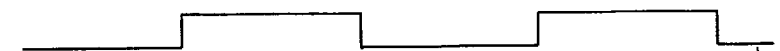
Fig.7C  Hw
Fig.7D  PATTERN RISING UP
Fig.7E  PATTERN FALLING DOWN
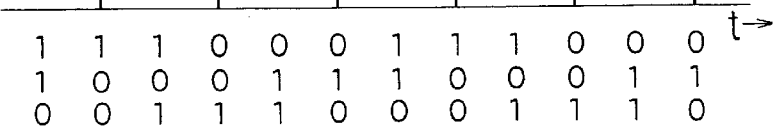
Fig.7F

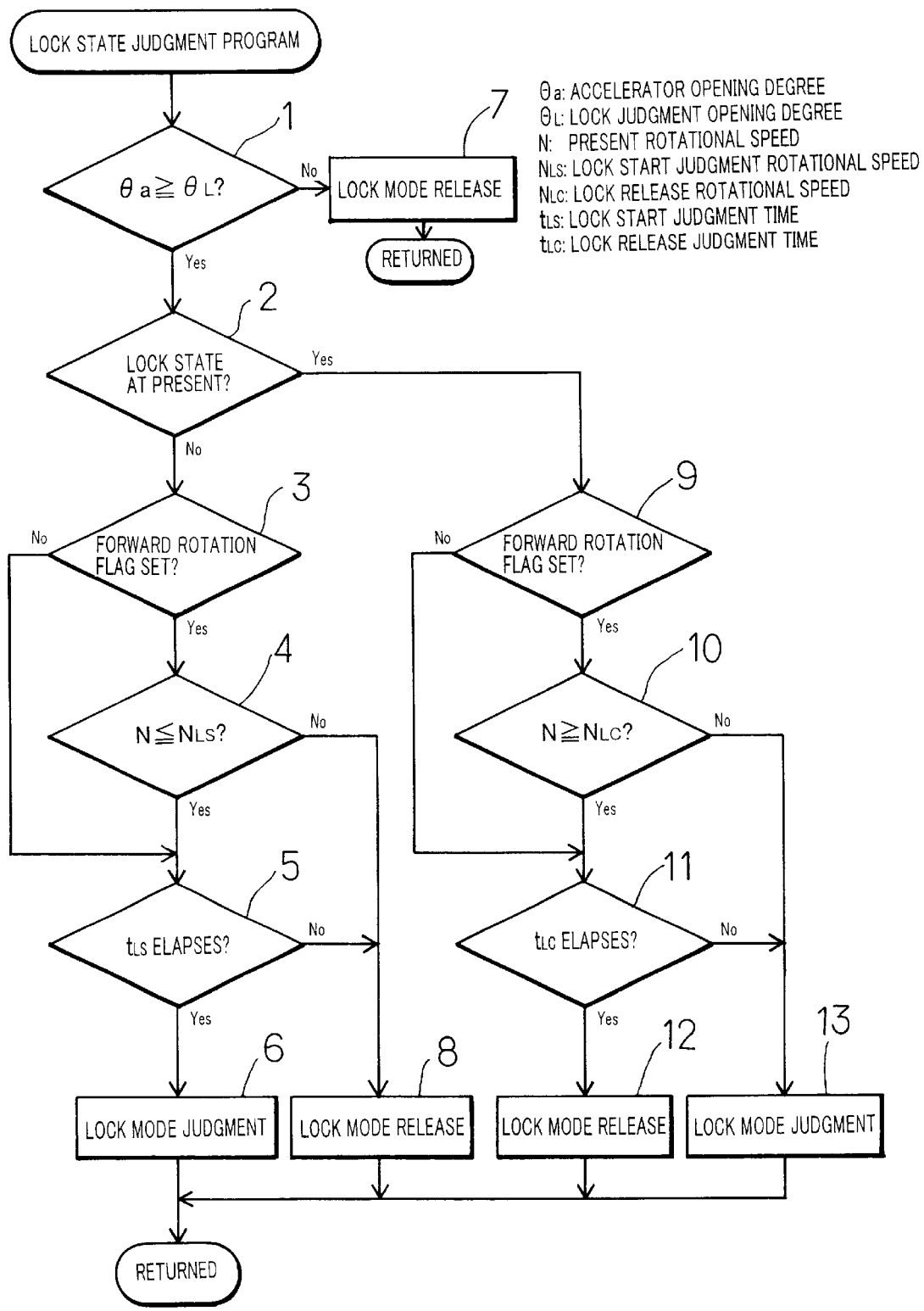

CONTROL SYSTEM FOR ELECTRIC MOTOR FOR DRIVING ELECTRIC VEHICLE

TECHNICAL FIELD OF THE INVENTION

This invention pertains to a control system of controlling an electric motor used for a drive unit for an electric vehicle such as an electric scooter, an electric car or the likes.

BACKGROUND OF THE INVENTION

In general, an electric motor comprises a rotor having a field system and a stator having n phases armature coils (n is two or more integers) and is adapted to control a rotational speed by controlling a drive current flowing through the armature coils by means of a controller. Of late, there has been used one having a microprocessor provided as the controller.

In many cases, a brushless DC motor has been used for the electric motor driving the electric vehicle. As well known, the brushless DC motor comprises a rotor having a magnet field system and a stator having armature coils of multi-phases such as two or more phases. The rotor is rotated by switching an exciting phase of the armature coils to selectively energize the armature coils in accordance with a rotational angle position of the rotor relative to the stator.

A drive unit for driving the motor comprises position sensors to detect a rotational angle position of the rotor relative to the stator, a switch circuit to switch the exciting phase of the armature coils, an accelerator operation member operated when an output of the motor should be adjusted, an acceleration sensor to output an acceleration signal having a magnitude corresponding to the opening degree of the accelerator operation member which is detected as a displacement quantity of the accelerator operation member and a controller to control the switch circuit so that the armature coils are selectively energized to commutate in accordance with the output of the position sensors which flow through the armature coils to rotate the rotor.

The controller comprises a microprocessor to perform a predetermined program, which forms duty factor arithmetical operation means to arithmetically operate a duty factor of the drive current on a value of the acceleration signal, PWM control means to control the switch circuit so as to modulate a waveform of the drive signal into a pulse width modulation waveform (PWM waveform) having the duty factor DF arithmetically operated by the duty factor arithmetical operation means and current phase angle control means to shift the switching angle of the exciting phase of the armature coils by an advance angle relative to a reference switching angle determined on the output of the position sensors.

The duty factor DF of the drive current shows the ratio of an on-time of the drive current relative to the on-off period thereof and is determined by (t on/T)×100[%] wherein "t on" designates a time during which the drive current flows, "t off" designates a time during which the value of the drive current is zero and "T" (=t on+t off) designates an on-off period.

In the electric vehicle, there is adjusted the output of the electric motor by displacing the accelerator operation member such as an accelerator grip or an accelerator pedal and, in order to obtain a good operation feeling of the vehicle and a smooth operation thereof, the duty factor DF of the drive current should be controlled relative to both of the displacement quantity (the opening degree $\alpha$ of the accelerator) and the rotational speed N of the motor whereby the change rate of the duty factor DF relative to the accelerator operation member varies in accordance with the rotational speed [rpm].

In the case where the duty factor DF is controlled relative to both of the opening degree $\alpha$ of the accelerator and the rotational speed N of the motor, a three-dimensional look-up table giving a relationship between the opening degree $\alpha$ of the accelerator, the rotational speed N of the motor and the duty factor DF of the drive current is stored in a ROM, the duty factor DF is arithmetically operated on the rotational speed N of the motor and the opening degree $\alpha$ of the accelerator by the microprocessor with this look-up table used and switch elements of the switch circuit are controlled so that the drive current intermittently flows in the thus obtained duty factor DF.

In the brushless DC motor, the actual switching angle (the electrical angle) for switching over the exciting phase of the armature coils is shifted just by the predetermined angle relative to a theoretical switching angle determined by the mechanical structure of the electric motor. A phase difference between the actual switching angle and the theoretical switching angle is called a current phase angle $\gamma$, which is generally set on an advance side.

The generation torque and the maximum rotational speed of the brushless DC motor vary on the current phase angle $\gamma$. As the current phase angle $\gamma$ is so set that the torque is larger, the maximum rotational speed gets lower and as the current phase angle $\gamma$ is advanced, the maximum rotational speed gets higher, but the generation torque gets lower.

Generally, in the case where the brushless DC motor is used as the drive unit of the electric vehicle, the current phase angle $\gamma$ by which the fully high torque can be obtained at the low speed is set as a regular current phase angle $\gamma o$, the current phase angle $\gamma$ is advanced relative to the regular current phase angle $\gamma o$ as the rotational speed increases in the area where the rotational speed exceeds the set value, and the advance amount of the current phase angle $\gamma$ is held at the maximum value in the area where the rotational speed exceeds the set advance termination rotational speed at which the advance of the current phase angle is terminated.

In the case where the aforementioned control of the current phase angle is performed, a three-dimensional look-up table giving a relationship between the displacement quantity $\alpha$ of the accelerator operation member (the opening degree of the accelerator), the rotational speed N of the motor and the current phase angle $\gamma$ is stored in the ROM, the current phase angle $\gamma$ is arithmetically operated on the detected value of the opening degree of the accelerator and the detected value of the rotational speed by using the look-up table and the current phase angle of the electric motor is controlled so as to be equal to the arithmetically operated current phase angle.

In the case where the current phase angle $\gamma$ is advanced more than the regular current phase angle $\gamma o$ in the area where the rotational speed exceeds the set value as aforementioned, when the vehicle is running uphill in the full accelerating state where the accelerator operation member is displaced to the maximum value toward the accelerating side, the advance quantity of the current phase angle is held at the maximum value and therefore the drive current of the electric motor exceeds the rated value. As this state continues for a long time, the temperature of the armature coil rises and sometimes exceeds the allowable value. Especially, as the rotational speed of the electric motor is extremely lowered on the uphill road, it takes longer for the drive current to be commuted so that the temperature of the specific phase armature coil of the electric motor abruptly rises and therefore it is possible that the armature coil is damaged by heat. As the lock state where the electric motor stops rotating on the uphill road arises, the temperature of the armature coil of the specific phase determined on the stop position of the rotor rises and the armature coil is therefore damaged by heat because the large drive current flows through the specific phase armature coil.

Thus, the prior control system for the brushless DC motor for the electric vehicle is provided with a temperature sensor to detect the temperature of the armature coils, and when it is detected by the temperature sensor that the temperature of the armature coils abnormally rises, the drive current is limited so as to restrict the output of the electric motor whereby the temperature of the armature coils is prevented from rising.

However, if the current phase angle is kept to be advanced although the drive current is limited when the temperature of the armature coils rises, a large reactive current flows through the armature coils and therefore there arises a problem that the temperature of the armature coils cannot fully be lowered. In order to solve such a problem, when the abnormal rise of the temperature of the armature coils is detected, the control in which the current phase angle is delayed and the control in which the duty factor of the drive current is lowered are performed in combination for reducing the reactive current.

Although, in the aforementioned description, the duty factor of the drive current and the current phase angle are controlled, the armature coils will be damaged by heat even though the current phase angle is not controlled when the load gets excessive in the full acceleration state so that the rotational speed of the electric motor is extremely lowered or the electric motor stops rotating. Accordingly, even though the current phase angle is not controlled, the output of the electric motor should be limited by detecting the temperature of the armature coils so that it is prevented from rising.

In the prior control system for the brushless DC motor for the electric vehicle, the temperature sensor has been provided only in one phase armature coil among the multi-phase armature coils for limiting the output of the electric motor so as to prevent the temperature from rising when the temperature detected by the temperature sensor exceeds the allowable value. However, in the case that the temperature sensor is provided only in the one phase armature coil among the multi-phase armature coils, when the temperature of the specific armature coil in which no temperature sensor is provided happens to abnormally arise, the rise of the temperature cannot be detected and therefore the armature coils cannot be positively protected.

For instance, as the brushless DC motor stops being operated due to the overload in the fully opened state of the accelerator, the drive current is never commuted and therefore more current flows through the specific phase armature coil than through the other phase armature coils, which causes the rise of the temperature of the specific phase armature coil. In this case, if no temperature sensor is provided in the specific phase armature coil, the temperature rise thereof cannot be detected and therefore the armature coils cannot be positively protected.

When the electric motor nearly stops because the rotational speed thereof gets too lower even though it does not lock and it takes too much time to commute the drive current, the large drive current flows through the specific phase armature coil for a longer time so as to get the state similar to the lock state of the electric motor, which causes the specific phase armature coil to be overheated and possibly to be damaged by heat.

Furthermore, if the overload state of the electric motor changes due to variation of road conditions when there arises the situation that the electric vehicle cannot finish running steep uphill in the fully opened state of the accelerator, there sometimes arises the so-called hunting in which the electric motor repeats a forward rotation and a reverse rotation at an extremely low speed. In case that such a phenomenon arises, the large drive current flows through the specific phase armature coil for a longer time in the same manner as the stop state of the electric motor and therefore the temperature of the armature coil possibly rises in an abrupt manner. Thus, when the hunting state arises when the electric motor rotates at the extremely low speed, the control for preventing the temperature of the armature coils from rising is desirably performed so that the hunting state is dealt with in the same manner as the lock state.

Similarly, in these cases, if the temperature of only one phase armature coil is detected, the abnormal rise of the temperature of the armature coil cannot be sometimes detected and therefore the electric motor cannot be positively protected.

It will be considered that the temperature sensor may be provided in every phase armature coil in order to detect the temperature of all the phases of the multi-phase armature coils; however, this undesirably makes the cost expensive.

If the armature coils are provided on the rotor, the temperature of the armature coils cannot be prevented from rising because it cannot be detected, since the temperature sensors cannot be provided for detecting the temperature of the armature coils.

SUMMARY OF THE INVENTION

Accordingly, it is a principal object of the invention to provide a control system for an electric motor for an electric vehicle adapted to positively protect armature coils of the electric motor by preventing a temperature of the armature coils from abnormally rising without detecting the temperature of the armature coils when the electric motor stops rotating or rotates at an extremely low speed immediately before it nearly stops rotating due to overload.

It is another object of the invention to provide a control system for an electric motor for an electric vehicle adapted to positively protect armature coils of the electric motor by preventing a temperature of the armature coils from abnormally rising even when the armature coils are provided on a rotor of the electric motor.

It is further object of the invention to provide a control system for an electric motor for an electric vehicle adapted to positively protect armature coils in an extremely low speed state where a large drive current continues to flow through a specific armature coil for a longer time by detecting a hunting state arising in the extremely low speed state as well as a state where the electric motor rotates at the extremely low speed or stops rotating in a largely opened condition of an accelerator as a lock state of the electric motor.

The invention is applied to a control system for an electric motor for an electric vehicle to control an output of the electric motor for the electric vehicle relative to an opening degree of an accelerator, which is a displacement quantity of an accelerator operation member.

The invention is made in view of an abnormal rise of the temperature of the armature coils of the electric motor for driving the electric vehicle arising when the electric motor stops due to the overload thereof or rotates at the extremely low speed in a state where the opening degree of the accelerator is enlarged to some extent. The invention is adapted to prevent the temperature of the armature coils from abnormally rising by limiting an output of the electric motor when a state where the electric motor stops rotating while the opening degree of the accelerator has a value equal to or more than a predetermined judgment opening degree or a state where the rotational speed of the electric motor has a value equal to or less than a set lock start rotational speed is detected as a lock state.

Generally, what is meant by the lock state of the electric motor is a state where the rotation of the electric motor fully stops, but in the description, the lock state includes not only the full stop state of the electric motor, but also a state where the rotational speed of the electric motor is reduced to a value extremely low value, which is treated with as the lock state.

In order to embody the invention, the control system of the invention comprises an acceleration sensor to detect an opening degree of an accelerator and output an acceleration signal having a magnitude corresponding to the detected opening degree of the accelerator, rotational speed detection means to detect the rotational speed of the electric motor, steady-state-time drive current control means to control a drive current of the electric motor in accordance with the acceleration signal, lock state judgment means to judge that the electric motor is in a lock state when a state where the rotational speed detected by the rotational speed detection means has a value equal to or less than a set start rotational speed, or zero continues for a set lock start judgment time while the opening degree of the accelerator has a value equal to or more than a set lock judgment opening degree and that the electric motor is in the unlock state when a state where the opening degree of the accelerator is less than the lock judgment opening degree or the rotational speed of the electric motor is equal to or more than a lock release rotational speed set at a value higher than the lock start rotational speed continues for a set lock release judgment time, lock-time drive current control means to perform a drive current limit control to reduce the drive current from a value determined by the steady-state-time drive current control means to a lock-time limit value to limit the maximum value of the drive current to a value equal to or less than the lock limit value when the lock state of the electric motor is judged by the lock state judgment means and to release the drive current limit control by increasing the drive current from the lock-time limit value to the value determined by the steady-state-time drive current control means when the release of the lock state is judged.

As aforementioned, as the state where the rotational speed of the electric motor is reduced to the value equal to or less than the set lock start rotational speed or the electric motor stops while the opening degree of the accelerator is equal to or more than the predetermined judgment opening degree is detected as the lock state and the drive current of the electric motor is limited to a value equal to or less than the lock-time limit value when the lock state is detected, the temperature of the armature coils can be prevented from abnormally rising by setting the lock-time limit value at an appropriate value.

In this case, it will be noted that the armature coils can be protected without detecting the temperature of the armature coils and without making the cost expensive because the lock state judgment means and the lock drive current control means can be made up by a software.

Also, according to the invention, the armature coils can be protected from overheat in the case where the armature coils of the electric motor for driving the electric vehicle are provided on a rotor because the temperature of the armature coils need not to be detected.

It should be noted that the lock start judgment time set to detect the start of the lock state should be set at a fully short value so that the temperature of the armature coils never rises within the lock start judgment time in any case.

The lock start rotational speed used for judging the start of the lock state is set at a value slightly higher than the rotational speed when the time for which the drive current continues to flow through the armature coil of each phase reaches the allowable value when the opening degree of the accelerator has the maximum value (when the accelerator is fully opened).

What is meant by the time for which the drive current continues to flow through the armature coils is a time after the drive current starts to flow through the armature coil of each phase until the drive current is commuted to the other phase and is determined by the rotational speed of the electric motor. An allowable threshold value of the time for which the drive current continues to flow through the armature coil of each phase is a conduction time required until the temperature of the armature coils reaches the allowable maximum value.

When the rotational speed of the electric motor is higher than the lock start rotational speed, the drive current is commuted with a relatively short cycle. Thus, since the time for which the drive current flows through the armature coil of each phase is fully short, the temperature of the armature coil of each phase never exceeds the allowable value even though the accelerator is fully opened.

On the other hand, when the rotational speed of the electric motor is lower than the lock start rotational speed, the drive current is commuted with a longer cycle. Thus, since the time for which the drive current flows through the armature coil of each phase gets longer, the temperature of the armature coil of each phase abnormally rises.

The lock-time limit value of the drive current is set at a value equal to or less than the maximum value of the drive current which can continue to flow through the armature coil of each phase without abnormally increasing the temperature of the armature coil of each phase and enough to be able to generate a certain degree of torque from the electric motor.

As the torque continues to be generated from the electric motor by passing a certain amount of the drive current through the armature coils even though the electric motor is in the lock state as aforementioned, the vehicle can be prevented from running in a reverse direction by losing the torque even though it stops on a slope due to the lock state of the electric motor, for example.

The lock-time drive current control means may be preferably formed so as to perform the drive current limit control and the release thereof as described hereinbelow. More particularly, the lock-time drive current control means may be preferably formed so that it gets the lock mode when the electric motor is in the lock state to perform the drive current limit control to limit the maximum value of the drive current to a value equal to or less than the lock-time limit value by gradually decreasing the value of the drive current from a value determined by the steady-state-time drive current control means to the lock-time limit value over a set lock start control time and gets the lock release mode when it is judged that the electric motor is released from the lock state to release the drive current limit control by gradually increasing the value of the drive current from the lock-time limit value to the value determined by the steady-state-time drive current control means over a set lock release control time.

As the lock-time drive current control means made up in the aforementioned manner gradually decreases the drive current of the electric motor to the lock-time limit value when it gets the lock state and gradually increases the drive current when it is released from the lock state, the control to limit the drive current for the protection of the armature coils and the release thereof can be performed without any abrupt variation in the torque and therefore the protection operation can be accomplished without surprising the driver.

A brushless DC motor which is equipped with a rotor having a field system and a stator having n phase (n is two or more integers) armature coils is used well for the electric motor for driving the electric vehicle. With such an electric motor used, there is provided steady-state-time drive current control means including n position sensors to directly or indirectly detect the magnetic poles of the rotor relative to each of the n phase armature coils of the stator to generate an output having level varying whenever the polarity of the detected magnetic pole changes, a switch circuit provided between the DC power source and the armature coils to switch the exciting phase of the armature coils where the drive current flows from the DC power source, duty factor arithmetical operation means to arithmetically operate a duty factor of the drive current for the acceleration signal and switch control means to control the switch circuit so that the drive current of PWM waveform continuing in the duty factor obtained by the duty factor arithmetical operation means flows through the armature coil of phase determined in accordance with the output of the position sensors to rotate the rotor as well as the acceleration sensor to detect as the opening degree of the accelerator the displacement quantity of the accelerator operation member operated when the output of the electric motor is adjusted and the rotational speed detection means to detect the rotational speed of the electric motor.

In the case where such a brushless DC motor is used as the electric motor for driving the electric vehicle, the construction described hereinbelow is used so that the armature coils can be protected by detecting as the lock state a state where the hunting arises due to the extremely low speed of the electric motor as well as the state where the rotational speed of the electric motor is lowered.

More particularly, in the case where the hunting state as well is detected as the lock state, there are provided rotation state judgment means to judge whether the electric motor rotates in a forward direction by using the fact that variation in combination of the output state of the n position sensors (an output pattern of the n position sensors) is different on the forward rotation of the electric motor and the reverse rotation thereof, lock state judgment means to perform every predetermined time, judgment steps in which the lock mode of the electric motor is judged when the rotation state judgment means judges that electric motor rotates in the forward direction while the opening degree of the accelerator is equal to or more than the lock judgment opening degree and the state where the rotational speed is equal to or less than the set lock start judgment rotational speed, or zero continuers during a set lock start judgment time or when the state where it is judged that the electric motor does not rotate in the forward direction while the opening degree of the accelerator is equal to or more than the lock judgment opening degree continues during the set lock start judgment time and the release of the lock mode is judged when the opening degree of the accelerator is less than the lock judgment opening degree or when the state where the rotational speed of the electric motor is equal to or more than the lock release rotational speed set at a value higher than the lock start rotational speed continues during a set lock release judgment time and lock-time drive current control means to perform a drive current limit control to limit the maximum value of the drive current to a value equal to or less than the lock-time limit value when the lock mode of the electric motor is judged by the lock state judgment means and to release the drive current limit control when it is judged that the lock state is released.

With the aforementioned lock state judgment means provided, when the rotational direction of the electric motor is going to be reversed due to the hunting at the extremely low rotational speed of the electric motor, it is judged as the lock state so as to limit the drive current. Thus, it will be noted that the armature coils can be positively protected when the state where the large drive current flows through the armature coil of the specific phase due to the hunting continues.

BRIEF DESCRIPTION OF THE DRAWINGS

The above and other objects and features of the invention will be apparent from the detailed description of the preferred embodiments of the invention, which is described and illustrated with reference to the accompanying drawings, in which;

FIGS. 6A through 6F illustrate diagrams showing how an output pattern of position sensors varies when a rotor of an electric motor of FIG. 5 rotates in a forward direction;

FIGS. 7A through 7F illustrate diagrams showing how the output pattern of position sensors varies when the rotor of the electric motor of FIG. 5 rotates in a reverse direction;

and FIG. 9 illustrates a flow chart of an example of an algorithm practiced by a computer to form lock state judgment means used in the second embodiment of the invention.

DETAILED DESCRIPTION OF PREFERRED EMBODIMENTS

Figure 1:
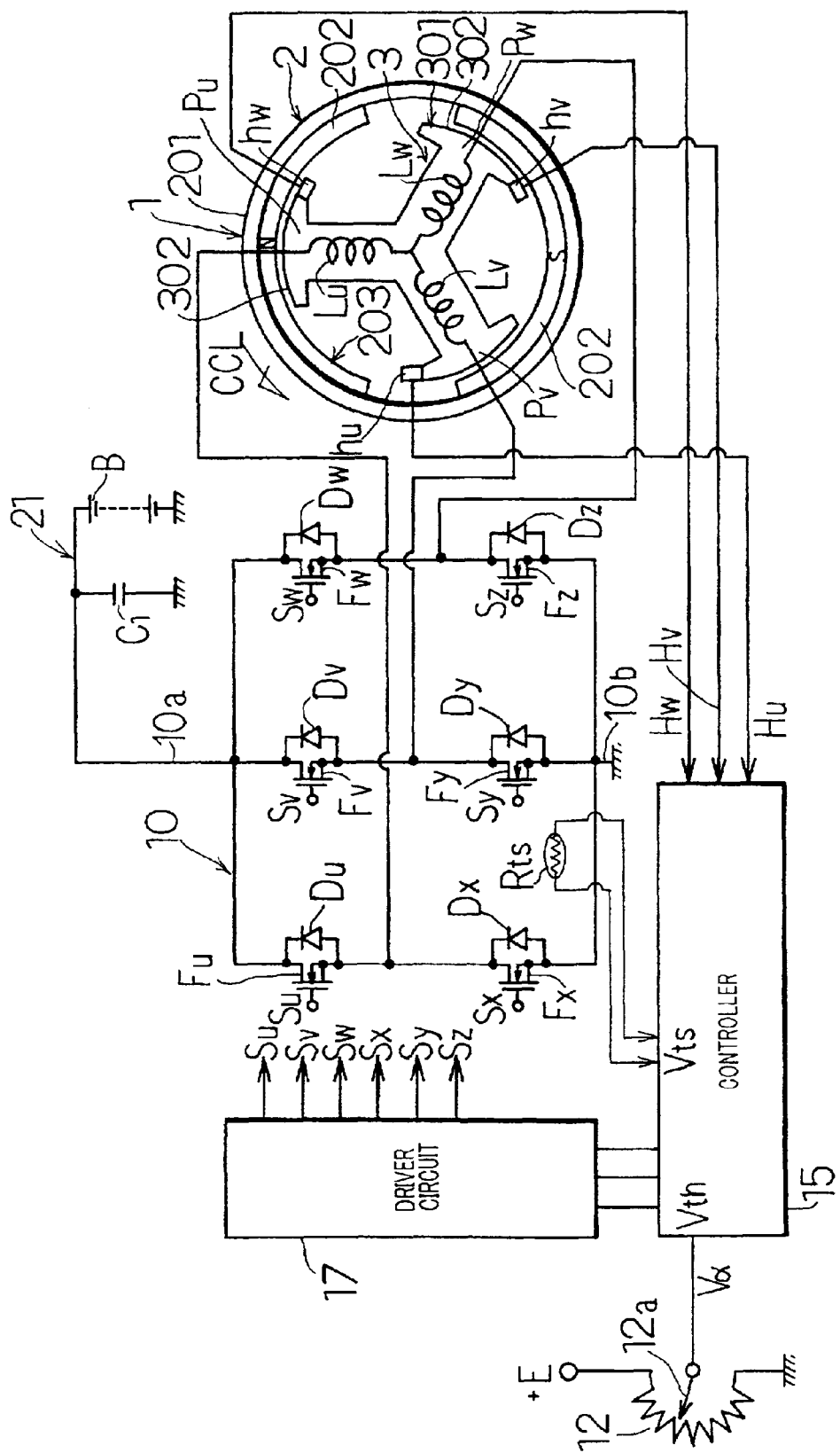
FIG. 1 is a schematic diagram of a hardware constructed in accordance with a first embodiment of the invention.

Referring now to FIG. 1, there is shown a hardware of a first embodiment of the invention. An outer rotor type brushless DC motor 1 comprises a rotor 2 and a stator 3. The rotor 2 comprises a yoke 201 of ferromagnetic material in the form of cup and two circular permanent magnets 202 and 202 attached on an inner periphery of a peripheral wall of the yoke 201 at an angular interval of 180 degree. The permanent magnets 202 and 202 are magnetized in a radial direction with the polarities different from each other and form a bi-polar magnet field system 203.

It should be noted that the magnet filed system 203 is not limited to the bi-polar one, but may be of 2m-polar one (m is one or more integers).

In the illustrated embodiment, the regular rotational direction of the rotor 2 is indicated by an arrow CCL (or in a counterclockwise direction).

The stator 3 comprises a stator core 301 having three radial tooth parts Pu–Pw protruded in a radial direction from a yoke and three phase armature coils Lu–Lw wound on the tooth parts Pu–Pw of the stator core 301. The armature coils Lu–Lw are connected in three phase star form. A stator magnetic pole 302 is formed on an outer peripheral portion at a leading end of each of the tooth parts Pu–Pw of the stator core 301. The stator 3 may be fixed to a frame of an electric vehicle so that the stator poles 302 at the leading ends of the tooth parts Pu–Pw of the stator core 301 are faced to the magnet field system 203 of the rotor 2 through a predetermined gap.

In the illustrated embodiment, the stator core is of three pole type, but it may generally have 3n tooth parts (n is one or more integers) on which the three phase armature coils are wound.

The yoke 201 has a boss (not shown) provided at a center of a bottom wall thereof. The boss is directly attached on an axle of a driving wheel of the electric vehicle or a rotational shaft tightly bonded on the boss is connected through a reduction gear to the axle of the driving wheel of the electric vehicle.

In order to detect a rotational angle position of the rotor 2 relative to the stator 3, there are mounted position sensors hu, hv and hw of three phases U, V and W, respectively on the stator core 301.

Each of the position sensors is disposed at an appropriate position in accordance with an energization angle (an electric angle) of the drive current flowing through the armature coil of each phase and the rotational direction of the rotor. For instance, in the illustrated embodiment, in the case where the rotor rotates in a counterclockwise direction and the motor rotates while a 180 degree switching control is performed, which the drive current flows through the armature coil of each phase through the angle distance of 90 degree before and behind the position where the no-load induction voltage induced in the armature coils Lu–Lw as the rotor 2 rotates reaches a peak value (the position where a magnetic flux flowing from the magnet field system 203 through the tooth parts on which the armature coil of each phase is wound passes the zero point), the position sensors of each phase are disposed so as to detect the rotational angle position of the rotor when the central positions of the magnetic poles of the tooth parts Pu, Pv and Pw on which the armature coils Lu, Lv and Lw of three phases are wound, respectively is coincident with the central position of the magnetic poles of the magnet filed system of the rotor 2 (or so as to change the output level of the position sensors at the corresponding rotational angle position).

In the illustrated embodiment, the position sensors hu, hv and hw of three phases U, V and W are attached at the tooth parts Pv, Pw and Pu of the stator core 301 so that the rotational angle position of the rotor 2 is detected when the central positions of the magnetic poles of the tooth parts Pu, Pv and Pw are coincident with the central position of the respective magnetic poles of the magnet filed system of the rotor 2.

As shown in FIG. 1, in the case where the armature coils Lu–Lw are wound on the three tooth parts Pu–Pw, respectively and there are used Hall effect elements IC as the position sensors hu, hv and hw attached to the tooth parts Pv, Pw and Pu, respectively, the position sensors hu, hv and hw are disposed at the positions phase-advanced by the electric angle of 90 degrees relative to the center of the respective magnetic poles of the tooth parts Pv, Pw and Pu whereby the current phase angle is determined so that the actual switching angle is advanced or delayed relative to a reference switching angle, which is the switching angle of the drive phase determined by the combination of the levels of the position detection signals output by the position sensors (the phase of the armature coil through which the drive current should flow in order to rotate the rotor in the predetermined direction).

A switch circuit (also referred to as an inverter circuit) 10 is provided between the armature coils Lu–Lw and a DC power source 11 to switch an energization phase of the armature coils. This switch circuit comprises a bridge circuit including upper side switch elements Fu through Fw having one end commonly connected to each other and lower side switch elements Fx through Fz having one end connected to the other ends of these upper side switch elements and other end commonly connected to each other. In the illustrated switch circuit 10, the one end common connection point of the upper side switch elements Fu through Fw and the other end common connection point serve as the positive DC terminal 10a and the negative DC terminal 10b, which are connected to a positive terminal and a negative terminal of a battery B as a DC power source 11. A capacitor C1 is connected to both ends of the battery B.

There may be used an on-off controllable switch such as a MOSFET, an electric power transistor, an IGBT or the like as the switch element of the switch circuit. In the illustrated embodiment, the respective switch elements comprise the MOSFET.

In order to pass a regeneration current when the electric vehicle is braked, there are feedback diodes Du–Dw and Dx–Dz connected in parallel to the upper side and lower side switch elements Fu through Fw and Fx through Fz. In the case where there are used the MOSFETs as the respective switch elements as shown in FIG. 1, there may be used parasitism diodes formed between the drain and the source of the FET as these feedback diodes.

In order to control the switch circuit 10, there are provided a controller 15 including a microprocessor and an input-output interface and a driver circuit 17 to apply drive signals (signals for getting an on-state of the switch elements) Su–Sw and Sx–Sz to the switch elements Fu through Fw and Fx through Fz, respectively in accordance with the signals given from the controller 15. The position signals Hu through Hw obtained from the position sensors hu through hw, respectively, are input to the controller 15.

An acceleration sensor 12 serves to detect as an accelerator opening degree α a displacement quantity of an accelerator operation member such as an acceleration grip, an acceleration pedal or the like, which serves to adjust the speed of the electric vehicle. The illustrated acceleration sensor 12 comprises a potentiometer having a movable contact 12a connected to the accelerator operation member.

Across both ends of the potentiometer forming the acceleration sensor 12 is applied a DC constant voltage E obtained from a constant voltage DC power source not shown whereby there is obtained between the movable contact 12a of the potentiometer and the ground an acceleration signal Vα proportional to the accelerator opening degree α. The acceleration signal Vα obtained from the accelerator sensor 12 is input to the controller 15. The acceleration signal Vα is converted by an A/D converter in the controller 15 into the digital value Vth and then read into the microprocessor.

In the illustrated embodiment, in order to detect the temperature of the switch elements forming the switch circuit 10, there is thermally bonded a temperature sensitive resistance element Rts (see FIG. 1) to the heat sink mounted on the forming elements of the switch circuit 10. The temperature sensor for the switch circuit is formed by the temperature sensitive resistance element Rts. In the controller 15, there is provided a electric power source (not shown) for applying a constant DC voltage across the both ends of the temperature sensitive resistance element Rts and the temperature detection signal Vts obtained from both ends of the temperature sensitive resistance element Rts is input to the analogue input port of the microprocessor in the controller 15. The temperature sensitive resistance element Rts may be either of positive temperature coefficient or of negative temperature coefficient.

The controller 15 makes the microprocessor perform the predetermined program so as to measure the generation interval of the position detection signals of rectangular waveform generated by the position sensors hu through hw and arithmetically operate the rotational speed N [r.p.m.] of the electric motor from the measured generation interval of the position detection signals.

Also, the controller 15 arithmetically operates the duty factor DF of the drive current to be supplied to the armature coils of the brushless DC motor 1 and the current phase angle γ for the accelerator opening degree obtained from the value (digital value) Vth of the acceleration signal and the obtained rotational speed N. What is meant by the current phase angle γ is a phase difference between the actual switching angle where the phase of the armature coils through which the drive current flows is switched and the reference switching angle determined by the arrangement of the position sensors.

The arithmetical operation of the duty factor DF of the drive current and the current phase angle γ is performed by an interpolation method using a three-dimensional look-up table for the duty factor arithmetical operation providing the relation between the rotational speed N, the accelerator opening degree α and the duty factor DF and a three-dimensional look-up table for the current phase angle arithmetical operation providing the relation between the rotational speed N, the accelerator opening degree α and the current phase angle γ. Both of the look-up tables are stored in the ROM.

Rotational speed detection means to detect the rotational speed of the electric motor is accomplished by the step of arithmetically operating the rotational speed among the program performed by the microprocessor forming the controller 15.

Duty factor arithmetical operation means to arithmetically operate the duty factor of the drive current for the value of the acceleration signal and the rotational speed is accomplished by the step of arithmetically operating the look-up table for the duty factor while using the duty factor arithmetical operation and current phase angle arithmetical operation means to arithmetically operate the current phase angle for the value of the acceleration signal and the rotational speed is accomplished by the step of arithmetically operating the current phase angle for the acceleration signal while using the look-up table for the arithmetical operation of the current phase angle.

The controller 15 also forms switch control means to control the switch elements of the switch circuit 10 so as to pass the drive current through the armature coil of phase determined in accordance with the output of the position sensors hu through hw in order to rotate the rotor by practicing the predetermined program by means of the microprocessor.

The switch control means determines the exciting phase of the armature core based on the position detection signals obtained from the position sensors hu through hw and applies to the drive circuit 17 a command signal commanding the drive signal to be applied to the predetermined switch element of the switch circuit 10 while switching the exciting phase of the armature coil for the switching angle having the current phase angle arithmetically operated by the current phase angle arithmetical operation means so that the drive current of PWM waveform intermittently varying in the duty factor arithmetically operated by the duty factor arithmetical operation means flows through the armature coil of the phase determined based on the position detection signal.

The driver circuit 17 applies the drive signal to the predetermined switch element of the switch circuit in accordance with the command signal applied from the controller 15. The drive signal serves to turn the predetermined switch element into the on-state.

Steady-state-time drive current control means to control the drive current of the electric motor in accordance with the acceleration signal so as to adjust the output of the electric motor on to the accelerator opening degree is formed by the duty factor arithmetical operation means and the switch control means.

Figure 2:
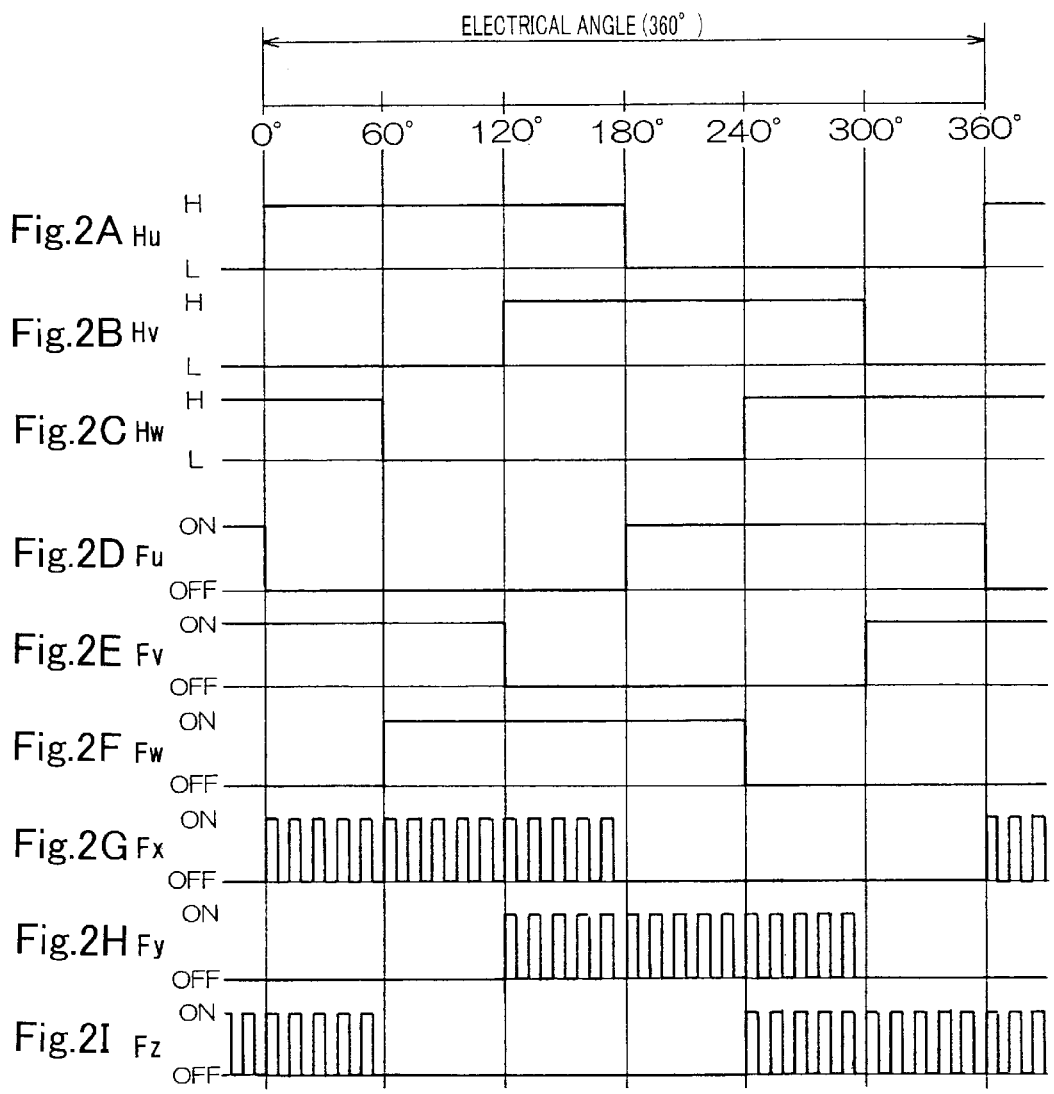
FIGS. 2A through 2I illustrate waveforms of position signals for an electric motor and on-off operation of switch elements of a switch circuit.

FIGS. 2A through 2I show the waveforms of the position signals for driving the brushless DC motor of FIG. 1 while performing the 180 degree switching control and the waveforms of on-off operation of the switch elements of the switch circuit 10. FIGS. 2A through 2C show as an example the position detection signals Hu through Hw generated by the position sensors hu through hw, respectively and FIGS. 2D through 2F show an on-off operation of the upper side switch elements Fu through Fw of the switch circuit 10 in the case where the angle for which the phase of the armature coil through which the drive current flows is switched is set as a reference switching angle. FIGS. 2G through 2I show an on-off operation of the lower side switch elements Fx through Fz of the switch circuit 10, respectively.

These signals are two value signals getting either one of a Hi level state and a Lo level state and the instant outputs of the position sensors can be expressed by "1" or "0".

In the description, the combination of the levels of the outputs Hu through Hw of the position sensors hu through hw in the case where they are expressed by "1" or "0" is referred to as the output pattern of the position sensors.

The controller 15 determines the interval during which the switch elements of the switch circuit 10 are in the on-state and the interval during which they are in the off-state and applies the drive signal to the switch elements during the interval of the on-state of the switch elements. In the illustrated embodiment, in order to control the drive current in the PWM form, the drive signal to be applied to the lower side switch elements Fx through Fz may be of waveform intermittently varying in the duty factor arithmetically operated by the duty factor arithmetical operation means and the on-off operation of the lower side switch elements is carried out in the duty factor arithmetically operated by the duty factor arithmetical operation means.

In the illustrated embodiment, PWM control means to control the switch circuit 10 so that the drive current is of PWM waveform having the duty factor arithmetically operated for the acceleration signal is formed by the step of making the drive signal applied to the switch elements Fx through Fz intermittent in the duty factor arithmetically operated by the duty factor arithmetical operation means among the steps of the program practiced by the microprocessor of the controller 15.

The maximum generation torque and the highest rotational speed of the brushless DC motor change in accordance with the current phase angle γ. In general, the magnitude of the current phase angle is set up in accordance with the usage of the electric motor, the required torque characteristic, the required highest rotational speed and so on. In the case of many brushless DC motors for driving the electric vehicle, when the rotational speed of the electric motor is equal to or less than a set value, the current phase angle γ is fixed to a regular current phase angle γo. Within the range of the rotational speed exceeding the set advance start rotational speed, the control advance angel γ is advanced relative to the regular current phase angle γo as the rotational speed of the electric motor increases. Within the range of the rotational speed of the electric motor being equal to or more than the advance end rotational speed, in many cases, the current phase angle γ is so controlled as to fix the advance quantity of the current phase angle to the set maximum value.

In the case where the current phase angle γ is controlled, there is provided in the controller 15 current phase angle control means to control the switching angle for which the drive current flowing phase is switched so as to shift it relative to the reference switching angle determined by the output of the position sensors through the current phase angle arithmetically operated for the acceleration signal.

The current phase angle control means is formed by the step of determining the time at which the drive current flowing phase is switched from the current phase angle arithmetically operated by the current phase angle arithmetical operation means and the reference switching angle determined by the output of the position sensors among a series of the steps of the program practiced by the microprocessor of the controller 15.

Although it is arbitrary how the regular current phase angle γo is set, it is generally set at the value of the current phase angle from which the maximum torque is obtained in order to increase the torque when the electric vehicle starts.

In the case where the control is performed so that the current phase angle γ is advanced relative to the regular current phase angle γo in the area of the rotational speed N exceeding the set value, when the electric vehicle is driven in the state of the maximum displacement quantity of the accelerator operation member toward the acceleration side on a hill etc. (in the full acceleration state), the advance quantity of the current phase angle γ is maintained at the maximum value and the drive current of the electric motor gets the state where it exceeds the rated value. In this state, as the rotational speed of the electric motor is extremely lowered and the state where the drive current flows through the armature coil of each phase continues for a long time, the temperature of the armature coils possibly rises until it exceeds the allowable value.

To avoid this, in the invention, there are provided lock state detection means to detect a lock state including a low rotational speed state of the electric motor which causes the temperature of the armature coils to increase until it exceeds the allowable value and a state where the rotation of the electric motor stops and lock-time drive current control means to control the drive current of the electric motor so as to limit it when the lock state is detected.

The lock state judgment means serves to judge that the electric motor is in the lock state when a state where the rotational speed N detected by the rotational speed detection means is equal to or less than the set value of the lock start judgment rotational speed NLS or a state where the rotational speed gets zero continues during a set lock start judgment time tLS while the accelerator opening degree corresponding to the displacement quantity of the accelerator operation means toward the acceleration side which is detected from the acceleration signal is equal to or more than a set value of the lock judgment opening degree and to judge that the lock state is released when the accelerator opening degree gets less than the lock judgment opening degree or when a state where the rotational speed N is equal to or more than the lock release rotational speed NLC set at a value higher than the lock start judgment rotational speed NLS continues during the lock release judgment time tLC.

The lock-time drive current control means gets the lock mode of the drive current when it is judged that the electric motor is in the lock state to perform the drive current limit control where the duty factor of the drive current gradually decreases over the set lock start control time from the value arithmetically operated by the duty factor arithmetical operation means to the lock-time limit duty factor so that the maximum value of the drive current is limited to a value equal to or less than the lock-time limit value and to perform the release control when it is judged that the lock state is released where the duty factor of the drive current gradually decrease over the set lock release control time from the lock-time limit value to the value arithmetically operated by the duty factor arithmetical operation means so that the drive current limit control is released.

Figure 3:
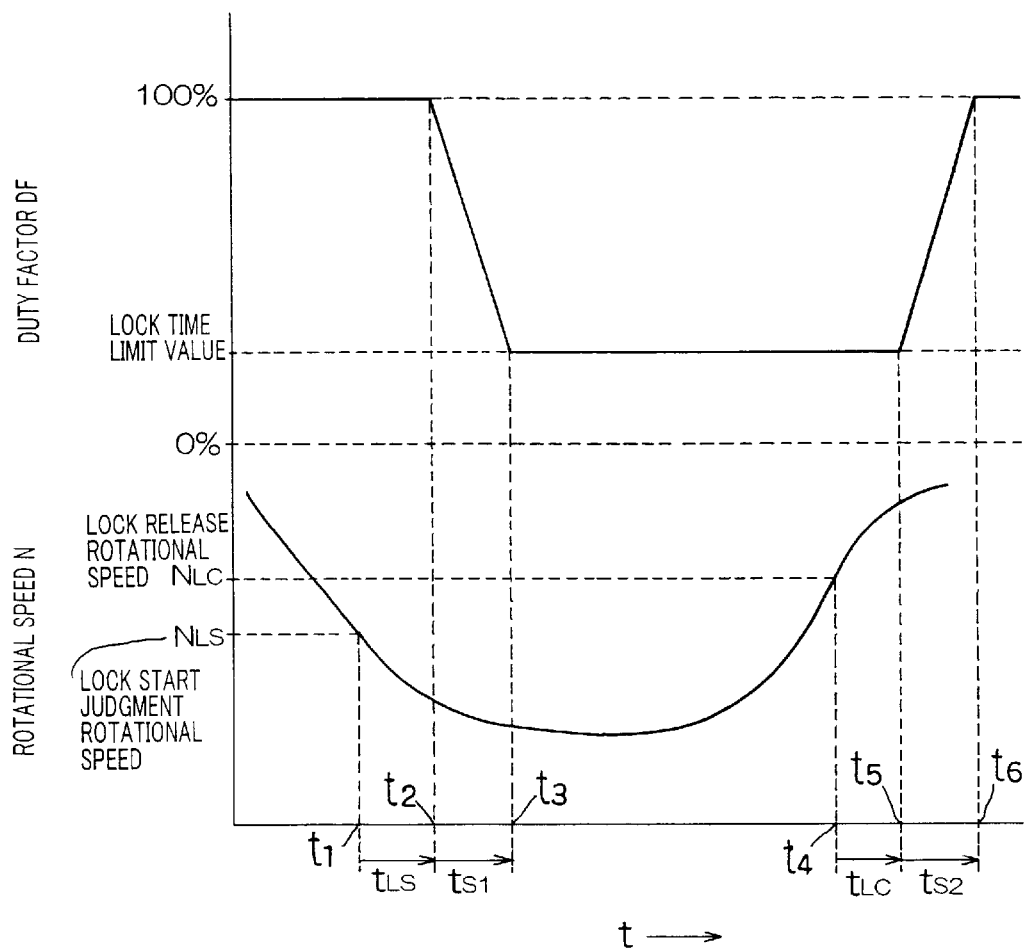
FIG. 3 illustrates a diagram showing how a duty factor of a drive current varies with time when a control system of the invention performs a protection operation and how the rotational speed of the electric motor varies with time, which are by way of example.

FIG. 3 illustrates variation in the duty factor DF of the drive current and variation in the rotational speed of the electric motor relative to time t when the accelerator operation member is kept at the maximum value of the opening degree (or when it is in the full acceleration state) in the control system of the invention. In the illustrated embodiment, after the rotational speed of the electric motor gets equal to or less than the lock start judgment rotational speed NLS at time t1 and at time t2 when the state where the rotational speed of the electric motor is equal to or less than the lock start judgment rotational speed continues during the lock start judgment time tLS, it is judged that the electric motor is in the lock state. After the lock state of the electric motor is judged at time t2, the duty factor DF is gradually reduced over the set lock start control time ts1 until it reaches the lock-time limit value.

After the rotational speed of the electric motor rises by reduction in load until it reaches the lock release rotational speed NLC set at a value higher than the lock start judgment rotational speed NLS at time t4 and when the set lock release judgment time tLC elapses at time t5, it is judged that the lock state is released and the duty factor DF of the drive current is gradually increased over the set lock release control time ts2 from the lock-time limit value to the value arithmetically operated by the duty factor arithmetical operation, which is 100%, in the illustrated embodiment.

Figure 4:
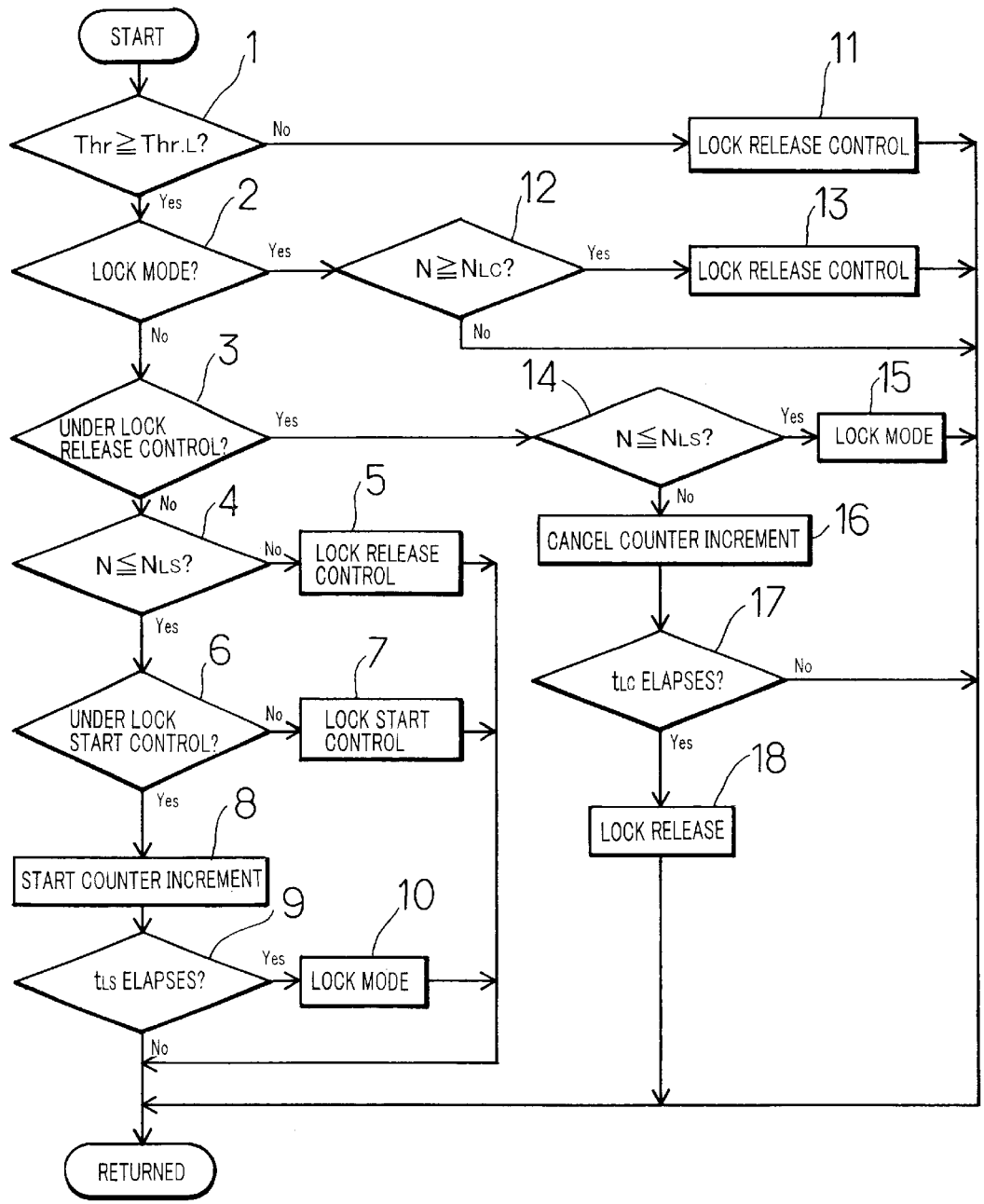
FIG. 4 illustrates a flow chart of an example of an algorithm practiced by a computer to form lock state judgment means provided in the control system of the invention.

FIG. 4 illustrates an example of algorithm of the program practiced by the microprocessor in the controller 15 in order to accomplish the aforementioned lock state judgment means. In this example, a plurality of tasks for accomplishing the predetermined functions by a multi-tasking method are subsequently practiced at predetermined intervals whereby various means required to control the electric motor such as rotational speed arithmetical operation means, duty factor arithmetical operation means, steady-state-time drive current control means and so on are realized.

FIG. 4 shows an example of algorithm of one task accomplishing the lock state judgment means. This task is practiced every 30 msec.

As the task shown in FIG. 4 starts, in the step 1, the present accelerator opening degree Thr detected by the acceleration sensor 12 is compared with the lock judgment opening degree ThrL and whether the present accelerator opening degree Thr is equal to or more than the lock judgment opening degree ThrL or not is judged. As a result, when the present accelerator opening degree Thr is equal to or more than the lock judgment opening degree ThrL, the program is advanced to the step 2 where whether the control mode is the lock mode or not is judged. If the control mode is not the lock mode, it is judged in the step 3 whether the lock release control is performed or not. As a result, when it is judged that the lock release control is not performed, the program is advanced to the step 4 where it is judged whether the present rotational speed N arithmetically operated by the not shown rotational speed arithmetical operation means is equal to or less than the lock start judgment rotational speed NLS. When the present rotational speed N exceeds the lock start judgment rotational speed NLS, the operation is advanced to the step 5 where the control mode is switched into the lock release control to start the lock release control.

In the lock release control, the duty factor of the drive current is gradually increased over the predetermined lock release control time ts2 from the lock-time limit value to the value arithmetically operated by the duty factor arithmetical operation means so that the limitation of the duty factor (the limitation of the drive current) is released.

In the step 4, when it is judged that the rotational speed N is equal to or less than the lock start rotational speed NSL, the program is advanced to the step 6 where it is judged whether the lock start control is performed or not. When the lock start control is not yet performed, the program is advanced to the step 7 where the lock start control (the control for measuring the continuation time during which the rotational speed N is equal to or less than the lock start judgment rotational speed NLS) starts.

When it is judged in the step 6 that the lock start control is performed, the operation is advanced to the step 8 where one increment of a count value of a start counter is carried out and the program is shifted to the step 9. In the step 9, the count value of the start counter is compared with the count value providing the lock start judgment time tLS to judge whether the count value of the start counter reaches the value providing the lock start judgment time tLS or not. When the count value of the start counter reaches the value providing the lock start judgment time tLS (when the lock start judgment time tLS elapses after it is detected that the rotational speed gets equal to or less than the lock start rotational speed), the program is advanced to the step 10 where the control mode of the drive current becomes the lock mode.

In this lock mode, as shown in FIG. 3, the duty factor of the drive current is gradually decreased over the lock start control time ts1 from the value arithmetically operated by the duty factor arithmetical operation means (100% in the example of FIG. 3) to the lock-time limit value previously set.

In the step 9, when it is judged that the count value of the start counter does not reach the value providing the lock start judgment time tLS, this task ends without carrying out anything.

When it is judged in the step 1 that the present accelerator opening degree is smaller than the lock judgment opening degree, the control mode becomes the lock release control mode in the step 11 and the shown task ends.

When it is judged in the step 2 that the control mode is in the lock mode, the program is advanced to the step 12 where whether the present rotational speed N is equal to or more than the lock release rotational speed NLC. If the rotational speed N gets equal to or more than the lock release rotational speed NLC, the program is advance d to the step 13 where the lock release control is performed. It is judged in the step 12 that the rotational speed N is lower than the lock release rotational speed NLC, this task ends without carrying out anything.

When it is judged in the step 3 that the lock release control is perform ed, the program is advanced to the step 14 where whether the rotational speed N is equal to or less than the lock start judgment rotational speed NLS or not is judged. As a result, when it is judged that the rotational sped N is equal to or less than the lock start judgment rotational speed NLS, the control mode becomes the lock mode and this task ends.

When it is judged in the step 14 that the rotational speed N exceeds the lock start judgment rotational speed NLS, one increment of a count value of a cancellation counter is carried out in the step 16 and then in the step 17 whether the count value of the cancellation counter reaches the value providing the lock release judgment time tLC or not is judged. As a result, when it is judged that the count value of the cancellation counter does not reach the value providing the lock release judgment time tLC (when the lock release judgment time tLC elapses after the lock release control starts), the task ends without carrying out anything. When it is judged in the step 17 that the count value of the cancellation counter reaches the value providing the lock release judgment time tLC (when the lock release judgment time tLC elapses after the rotational speed gets equal to or more than the lock release rotational speed), the program is advanced to the step 18 where the control mode of the drive current becomes the release mode and this task ends.

In the lock release mode, the duty factor of the drive current is gradually increased over the predetermined lock release control time from the lock-time limit value to the value arithmetically operated by the duty factor arithmetical operation means to release the limitation of the drive current.

In the embodiment shown in FIG. 4, the lock-time drive current control means is realized by the steps 10 and 18 while the lock state judgment means is realized by the other steps.

In the illustrated embodiment, there is provided control means for protection of the switch circuit to control the duty factor of the drive current to be limited to the value equal to or less than the previously set limit value in spite of the judgment result by the lock state judgment means when the heat sensitive resistance element (temperature sensor) Rts provided for the switch circuit 10 detects that the temperature of the switch elements of the switch circuit exceeds the allowable value set for the switch circuit.

With the control system thus formed, the temperature of the switch elements of the switch circuit is prevented from rising due to the over-current and therefore the switch elements from being damaged.

In the aforementioned embodiment, when the control mode of the drive current is in the lock mode, the drive current is gradually reduced over predetermined time from the value determined by the steady-state-time drive current control means to the lock-time limit value so as to limit the drive current and when the lock release control is performed as the lock release mode, the drive current is gradually increased over predetermined time from the lock-time limit value to the value determined by the steady-state-time drive current control means to release the limitation.

With the control system thus formed, since both of the drive current limit control and the release thereof can be performed without any abrupt variation in torque, then driver can be prevented from any undesirable shock when the drive current limit control and the release thereof are performed.

This invention is not limited to the lock-time drive current control means formed so that the drive current is gradually reduced or increased as aforementioned. The lock-time drive current control means may be formed so that the drive current is reduced to the lock-time limit value immediately when the lock state is detected or is returned to the steady-state-time value immediately when the release of the lock state is detected.

In the aforementioned embodiment, although the drive current of PWM waveform is obtained by turning on or off the lower side switch elements of the switch circuit, it may be obtained by turning on or off the upper side switch elements or both of the upper and lower side element switches.

In the illustrated embodiment, although the Hall effect element IC forming the position sensors is disposed at the position advanced by 90 degree relative to the center of the tooth part on which the armature coil of each phase is wound, it may be disposed at a position other than the aforementioned position so long as it can detect the rotational angle position of the rotor relative to the stator.

According to the aforementioned embodiment, when there is detected the lock state which includes the state where the electric motor stops rotating and the state where the rotational speed is lowered to the value equal to or less than the lock start judgment rotational speed while the accelerator opening degree has the value equal to or more than the predetermined judgment opening degree, the drive current of the electric motor is limited to the value equal to or less than the lock-time limit value and therefore the temperature of the armature coils can be prevented from abnormally rising by setting the lock-time limit value at the appropriate value.

According to the aforementioned embodiment, since the temperature of the armature coils is not required to be detected and the lock state judgment means and the lock-time drive current control means can be formed on the software, the armature coils can be protected without causing the rise of cost. Furthermore, according to the invention, even in the case where the armature coils of the electric motor for the electric vehicle are provided on the rotor, the armature coils can be also protected from the overheat because the temperature of the armature coils need not be detected.

Although, in the aforementioned embodiment, the brushless DC motor is used as the electric motor for driving the electric vehicle, the invention may be applied to the system in which the electric motor other than the brushless DC motor is used.

Although, in the first embodiment, the drive current of the electric motor is limited to the value equal to or less than the lock-time limit value when the lock state is detected which includes the state where the electric motor stops rotating and the state where the rotational speed is lowered to the value equal to or less than the lock start judgment rotational speed while the accelerator opening degree has the value equal to or more than the predetermined judgment opening degree, in the case where the brushless DC motor is used as the electric motor for driving the electric vehicle, the electric motor can be protected by detecting the state in which it repeats the forward rotation and the reverse rotation in the extremely low speed and the state in which the hunting arises.

Figure 5:
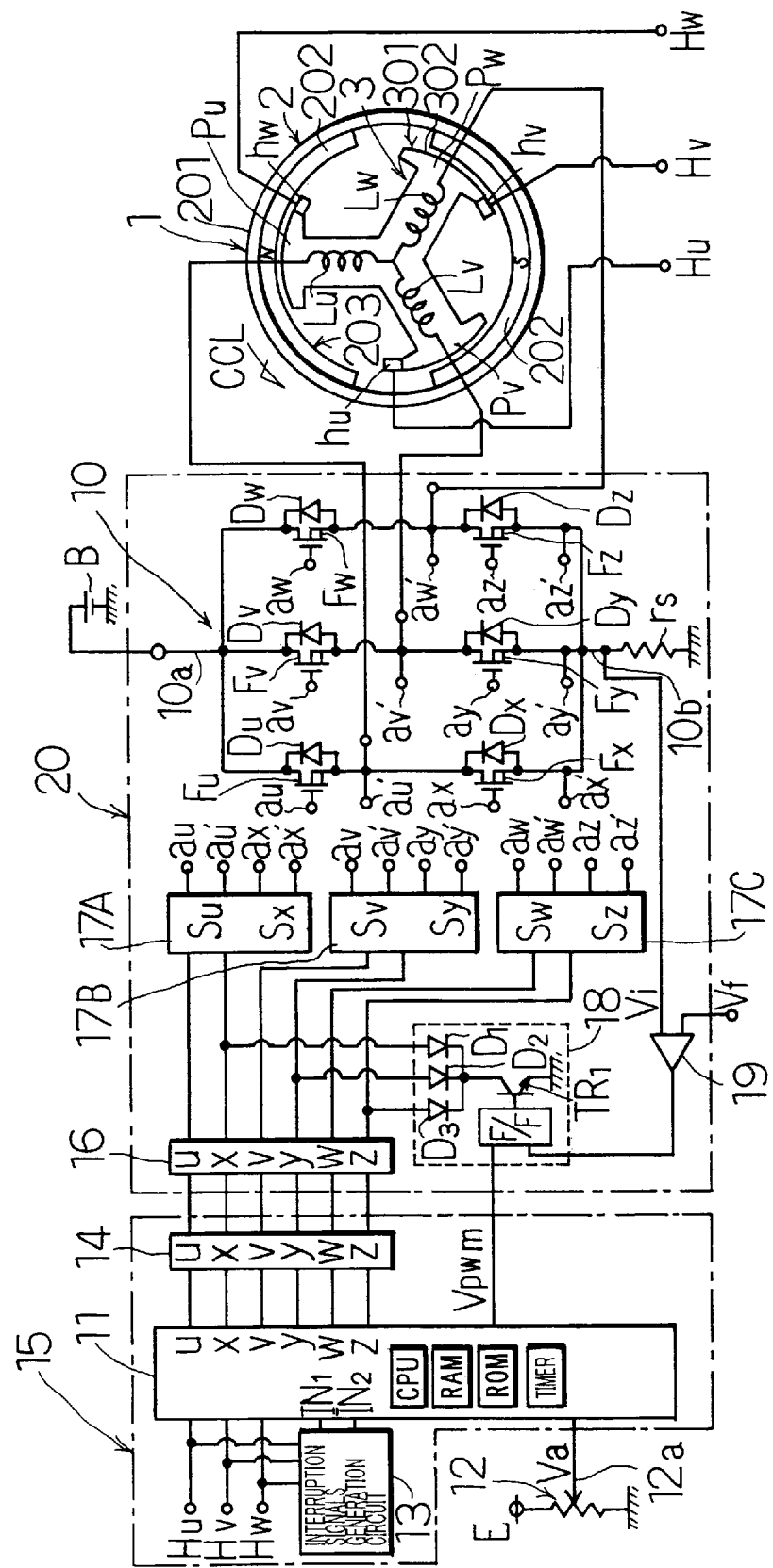
FIG. 5 is a schematic diagram of a hardware constructed in accordance with a second embodiment of the invention.

FIG. 5 illustrates a hardware constructed in accordance with the second embodiment of the invention in which not only the state where the rotational speed of the electric motor is extremely lowered and stops rotating in the condition of the large opening degree of the accelerator, but also the state where the hunting arises in the extremely low rotational speed are detected as the lock state whereby the armature coils can be positively protected in the extremely low speed state where the large drive current continues to flow through the armature coil of particular phase for a long time.

In FIG. 5, it is shown an outer rotor type brushless DC motor 1 comprising a rotor 2 and a stator 3, which is constructed in a manner similar to that of FIG. 1. Position sensors hu, hv and hw of U, V and W three phases are mounted on tooth parts Pv, Pw and Pu of a stator core 301, respectively and detects the rotational angle position of the rotor when the center position of the magnetic poles at the leading edges of the tooth parts Pu, Pv and Pw of the stator core is coincident with the center position of each of the magnetic poles of the magnet field system of the rotor 2.

FIG. 6 illustrates variation in the output pattern of the position sensors when the rotor rotates in a forward direction (a counterclockwise direction in FIG. 1). FIGS. 6A through 6C show output signals Hu through Hw of the position sensors hu through hw relative to time t, respectively, while FIGS. 6D and 6E show the timing at which the rising up of the signals Hu through Hw is detected and the timing at which the falling down of the signals Hu through Hw is detected. FIG. 6F shows variation in the output pattern of the position sensors.

As apparent from FIG. 6, in the case where the Hi level and the Lo level of the outputs Hu through Hw of the position sensors are expressed by "1" and "0", respectively, the output pattern varies as indicated by (101), (100), (110), (010), (011), (001), (101) - - - every 60 degree rotation of the rotor.

FIG. 7 illustrates variation in the output pattern of the position sensors hu though hw when the rotor rotates in a reverse direction. FIGS. 7A through 7C show the output signals Hu through Hw of the position sensors hu through hw relative to the time t, respectively, when the rotor rotates in the reverse direction while FIGS. 7D and 7E show the timing at which the rising up of the signals Hu through Hw when the rotor rotates in the reverse direction is detected and the timing at which the falling down of the signals Hu through Hw when the rotor rotates in the reverse direction is detected. FIG. 7F shows variation in the output pattern of the position sensors when the rotor rotates in the reverse direction.

As apparent from FIG. 7, in the case where the Hi level and the Lo level of the outputs Hu through Hw of the position sensors are expressed by "1" and "0", respectively, the output pattern varies as indicated by (110), (100), (101), (001), (011), (010), (110) - - - every 60 degree rotation of the rotor when it rotates in the reverse direction.

As aforementioned, since the order of variation of the output pattern of the position sensors hu through hw is previously determined and the orders when the rotor rotates in the forward direction and in the reverse direction are different from each other, the rotational direction of the rotor can be detected by comparing the output pattern of the position sensors detected at this time with that detected last time whenever a level variation of each of the position sensors hu through hw is detected.

In FIG. 5, there is shown a switch circuit 10 provided between the armature coils Lu through Lw and a DC power supply to switch the excitation phase of the armature coils in the same manner as that of FIG. 1. The switch circuit comprises a switch element bridge circuit including upper side switch elements Fu through Fw at one end connected to each other and lower side switch elements Fx through Fz at one end connected to the other ends of the upper side switch elements Fu through Fw and having the other ends connected to each other.

In the switch circuit 10, the common connection point of the upper side switch elements Fu through Fw at their one end and the common connection point of the lower side switch elements Fx through Fw at their other end become a DC terminal 10a of positive polarity and a DC terminal 10b of negative polarity, respectively. The DC terminal 10a of positive polarity is connected to the positive terminal of the DC power supply 21 which is comprised of a battery B and a capacitor C1, and the DC terminal 10b of negative polarity is connected to a ground circuit through a shunt resistance rs, which is provided for detecting the drive current. The ground circuit is connected also to the negative terminal of the DC power supply 21.

In this switch circuit 10, series circuits of the pairs of switch elements (Fu, Fx), (Fv, Fy) and (Fw, Fz) are referred to as first through third switch arms, respectively.

In order to pass the regeneration current when the electric vehicle should be braked, feedback diodes Du through Dw and Dx through Dz are connected in parallel to the upper side switch elements Fu through Fw and Fx through Fz, respectively. In the case where the MOSFET is used as the switch elements, the parasitism diode formed between the drain and the source of the FET may be used as the feedback diodes.

The controller 15 to control the switch circuit 10 comprises a microprocessor 11 including a microprocessor, a RAM, a ROM, a timer and so on and operated by a power supply voltage applied from a not shown DC power supply, an interruption signal generation circuit 13 to generate interruption signals IN1 and IN2 whenever the rising up and the falling down of the position detection signals Hu through Hw output by the position sensors hu through hw are detected and a buffer circuit 14. An acceleration signal Va output by the acceleration sensor 12 is input to the microprocessor 11.

There are also provided a buffer circuit 16 to which the output of the buffer circuit 14 is input, first through third switch arm drive circuits 17A through 17C to supply drive signals to the pair of switch elements (Fu, Fx), (Fv, Fy) and (Fw, Fz) of the first through third switch arms of the switch circuit 10 in accordance with the drive command signals (u, x), (v, y) and (w, z) applied from the microprocessor 11 through the buffer circuits 14 and 16, a PWM modulation circuit 18 and a comparator circuit 19 to compare the drive current detection signal Vi obtained across the shunt resistance rs with the set signal Vf providing the allowable maximum value of the drive current. The switch circuit 10, the buffer circuit 16, the drive circuits 17A through 17C, the PWM modulation circuit 18 and the comparator circuit 19 are united to form a motor drive unit 20.

The interruption signal generation circuit 13 generates the interruption signal IN1 when the edges of the rising up of the output signals Hu through Hw of rectangular waveform generated by the position sensors hu through hw, respectively are detected and generates the interruption signal IN2 when the edges of the falling down of the output signals Hu through Hw are detected. This interruption signal generation circuit may be formed of a differentiation circuit to differentiate the edges of the rising up and the falling down of the outputs of the position sensors hu through hw, for example.

The microprocessor 11 reads the interruption signals IN1 and IN2 to measure the time after the last interruption signal IN1 (or IN2) is generated until the present interruption signal IN1 (or IN2) is generated as the time data indicating the rotational speed of the electric motor and arithmetically operates the duty factor DF of the drive current supplied to the armature coils Lu–Lw of the brushless DC motor 1 and the current phase angle γ (the phase difference between the actual switching angle for which the phase of the armature coil having the drive current flowing therethrough is switched and the reference switching angle decided by the arrangement of the position sensors) in accordance with the time data and the accelerator opening degree detected by the acceleration sensor 12.

The arithmetical operation of the duty factor DF and the current phase angle γ may be made by using the three-dimensional look-up table for arithmetically operating the duty factor providing the relationship between the rotational speed N, the accelerator opening degree and the duty factor DF and the three dimensional look-up table for arithmetically operating the current phase angle providing the relationship between the rotational speed N, the accelerator opening degree and the current phase angle γ. Both of the look-up tables may be stored in the ROM.

The rotational speed detection means to detect the rotational speed of the electric motor may be accomplished by the step of measuring the time data providing the rotational speed among the programs practiced by the microprocessor 11. The duty factor arithmetical operation means to arithmetically operate the duty factor of the drive current for the value of the acceleration signal and the rotational speed may be accomplished by the step for arithmetically operating the duty factor by using the look-up table for arithmetically operating the duty factor while the current phase angle arithmetical operation means may be accomplished by the step of arithmetically operating the current phase angle for the acceleration signal by using the look-up table for arithmetically operating the current phase angle.

The microprocessor 11 also decides the exciting phase of the armature coil in accordance with the output pattern of the position sensors hu through hw whereby the rotor 2 rotates in the predetermined direction and outputs the drive command signals u, x, v, y, w and z to command the switch elements Fu, Fx, Fv, Fy, Fw and Fz of the switch circuit 10 to get the on-state at the predetermined timing whereby the drive current flows through the armature coils Lu–Lw of predetermined phase while switching the exciting phase of the armature coil at the switching angle advanced (or delayed) by the current phase angle arithmetically operated by the current phase angle arithmetical operation means relative to the phase switching angle decided by the pattern of the signals Hu through Hw. Also, in the illustrated embodiment, the microprocessor 11 applies to the PWM modulation circuit 18 the PWM signal Vpwm of pulse waveform intermittently varying in the duty factor arithmetically operated by the duty factor arithmetical operation means.

The drive command signals (u, x), (v, y) and (w, z) are applied through the buffer circuits 14 and 16 to the driver circuits 17A through 17C, respectively. The driver circuit 17A has output terminals au and au' connected to the gate and the source of the MOSFET forming the switch element Fu of the switch circuit 10, respectively, and output terminals ax and ax' connected to the gate and the source of the MOSFET forming the switch element Fx of the switch circuit 10, respectively. From the output terminals au and au' and from the output terminals ax and ax', the drive signals Su and Sx to be applied to the switch elements Fu and Fx, respectively are output.

The driver circuit 17B has output terminals av and av' connected to the gate and the source of the MOSFET forming the switch element Fv of the switch circuit 10, respectively, and output terminals ay and ay' connected to the gate and the source of the MOSFET forming the switch element Fy of the switch circuit 10, respectively. From the output terminals av and av' and from the output terminals ay and ay', the drive signals Sv and Sy to be applied to the switch elements Fv and Fy, respectively are output.

The driver circuit 17C has output terminals aw and aw' connected to the gate and the source of the MOSFET forming the switch element Fw of the switch circuit 10, respectively, and output terminals az and az' connected to the gate and the source of the MOSFET forming the switch element Fz of the switch circuit 10, respectively. From the output terminals aw and aw' and from the output terminals az and az', the drive signals Sw and Sz to be applied to the switch elements Fw and Fz, respectively are output.

Each of the switch elements forming the switch circuit 10 serves to get the on-state while the drive signal is applied from the driver circuit to pass the drive current through the armature coil connected to the corresponding switch element.

The microprocessor 11 determines the section for which each of the switch elements of the switch circuit 10 gets the on-state, and the section for which it gets the off-state by giving logic operation to the output signals Hu through Hw of the position sensors shown in FIGS. 2A through 2C and applies the drive signal to the corresponding switch element for the section during which it gets the on-state.

The microprocessor 11 also applies to the PWM modulation circuit 18 the PWM signal Vpwm of pulse waveform intermittently generated in the duty factor arithmetically operated for the accelerator opening degree and the rotational speed so that the drive current is controlled in the PWM form.

The illustrated PWM modulation circuit 18 comprises an NPN transistor TR1 having an emitter grounded to earth, diodes D1 through D3 having cathodes connected to a collector of the transistor TR1 and anodes connected to the output terminals of the buffer circuit 16 which outputs the drive command signals x, y and z to command the lower side switch elements of the switch circuit 10 to get the on-state, an RS flip-flop circuit F/F in the form of priority to a set signal, having the PWM signal Vpwm applied as the set signal from the microprocessor and having the output of the comparator circuit 19 applied as a reset signal. The positive logic output of the flip-flop circuit F/F is applied to the base of the transistor TR1.

The comparator circuit 19 compares the drive current detection signal Vi obtained across the both ends of the shunt resistance rs with the setting signal Vf which provides the allowable threshold value of the drive current to output the signal of high level (Hi level) when the drive current detected by the drive current detection signal Vi is equal to or less than the allowable threshold value and output the signal of low level (Lo level) when the drive current exceeds the allowable threshold value.

In the state where the drive current which flows through the armature coils Lu through Lw is equal to or less than the allowable threshold value and the reset signal of Hi level is applied from the comparator circuit 19 to the reset terminal of the flip-flop circuit F/F, when the PWM signal Vpwm applied from the microprocessor 11 to the set terminal of the flip-flop circuit F/F gets the Hi level and Lo level, respectively, the positive logic output gets the Hi level and Lo level, respectively to turn on and turn off the transistor TR1. This causes the waveform of the drive signals Sx through Sz applied to the lower side switch elements Fx through Fz of the switch circuit 10 to get the waveform intermittently generated in synchronization with the PWM signal Vpwm whereby the lower side switch elements Fx through Fz are turned on or off as shown in FIGS. 2G through 2I so that the drive current supplied to the armature coils Lu through Lw gets the waveform modulated in the form of PWM.

Since the negative logic output of flip-flop circuit F/F is maintained at Hi level when the output of the comparator circuit 19 gets Lo level, the transistor TR1 is maintained at the on-state, and the drive signal is prevented from being supplied to the lower side switch elements Fx through Fz of the switch circuit 10. This causes the drive current stops being supplied from the DC power supply 21 to the armature coils Lu through Lw whereby they are prevented from the over-current.

In the embodiment illustrated in FIG. 5, the step of generating the PWM signal Vpwm which is made intermittent by the arithmetically operated duty factor among the programs which the microprocessor 11 practices and the PWM modulation circuit 18 constitute the PWM control means to control the switch circuit 10 so that the drive current flowing through the armature coils Lu through Lw gets the PWM waveform having the duty factor arithmetically operated on the accelerator opening degree and the rotational speed.

In order to control the current phase angle $\gamma$, there is provided current phase angle control means to control the switching angle for the exciting phase of the armature coil to be shifted relative to the reference switching angle determined by output of the position sensors through the current phase angle arithmetically operated on the accelerator opening degree. This current phase angle control means is formed by the step of determining the timing when the exciting phase of the armature coil is switched from the current phase angle arithmetically operated by the current phase angle arithmetical operation among the series of the steps of the program practiced by the microprocessor 11.

In the vehicle driven by the brushless DC motor, in the case where the current phase angle $\gamma$ is controlled so as to be advanced relative to the regular current phase angle $\gamma o$ in the area where the rotational speed exceeds the set value, when the vehicle is driven uphill etc. while the displacement of the accelerator operation member toward the acceleration side gets the maximum value (while the accelerator opening degree gets the maximum state), the advance quantity of the current phase angle γ is maintained at the maximum value and the drive current of the electric motor exceeds the rated value. In such a state, as the rotational speed of the electric motor is extremely lowered and the state where the drive current flowing through the armature coils of respective phases continues for a long time, the temperature of the armature coils rises so as to possibly exceed the allowable value.

While the electric vehicle is running on the steep uphill road, there may arise a hunting phenomenon that the rotation of the electric motor is changed from the forward direction to the reverse direction and again changed from the reverse direction to the forward direction depending on the situation of the road surface. As the hunting phenomenon arises in such an extremely low speed state, the large drive current flows through the armature coil of each phase for a longer time and therefore the armature coils are possibly damaged by heat due to the rising temperature of them.

Thus, in the present embodiment, not only the state where the rotational speed of the electric motor is extremely lowered or stops while the accelerator opening degree is large, but also the state where the hunting arises while the accelerator opening degree is large are detected as the lock state; and when these lock states are detected, the drive current to be supplied to the armature coils is so controlled as to be limited. To this end, in the present embodiment, there are provided rotation state judgment means to judge whether the electric motor rotates in the forward direction or not, lock state judgment means to judge every predetermined time whether the electric motor is in the lock mode or in the state of releasing the lock mode and lock-time drive current limit means to limit the drive current of the electric motor when it is judged by the lock state judgment means that the electric motor is in the lock mode.

The rotation state judgment means serves to judge whether the electric motor rotates in the forward direction or not by using the fact that the combination of the output states of the three position sensors hu through hw (or the output pattern of the position sensors) to detect the rotational angle positions of the magnetic poles of the rotor relative to the three phase armature coils Lu through Lw, respectively is different from each other when the electric motor rotates in the forward direction (FIG. 6F) and the reverse direction (FIG. 7F). More particularly, whether the electric motor rotates in the forward direction or not is judged by comparing the output pattern of the position sensors hu through hw on the detection of the rising up (or the falling down) of the outputs of the respective position sensors with the output pattern of the position sensors on the detection of the last rising up (or the falling down) of the outputs of the respective position sensors.

Figure 8:
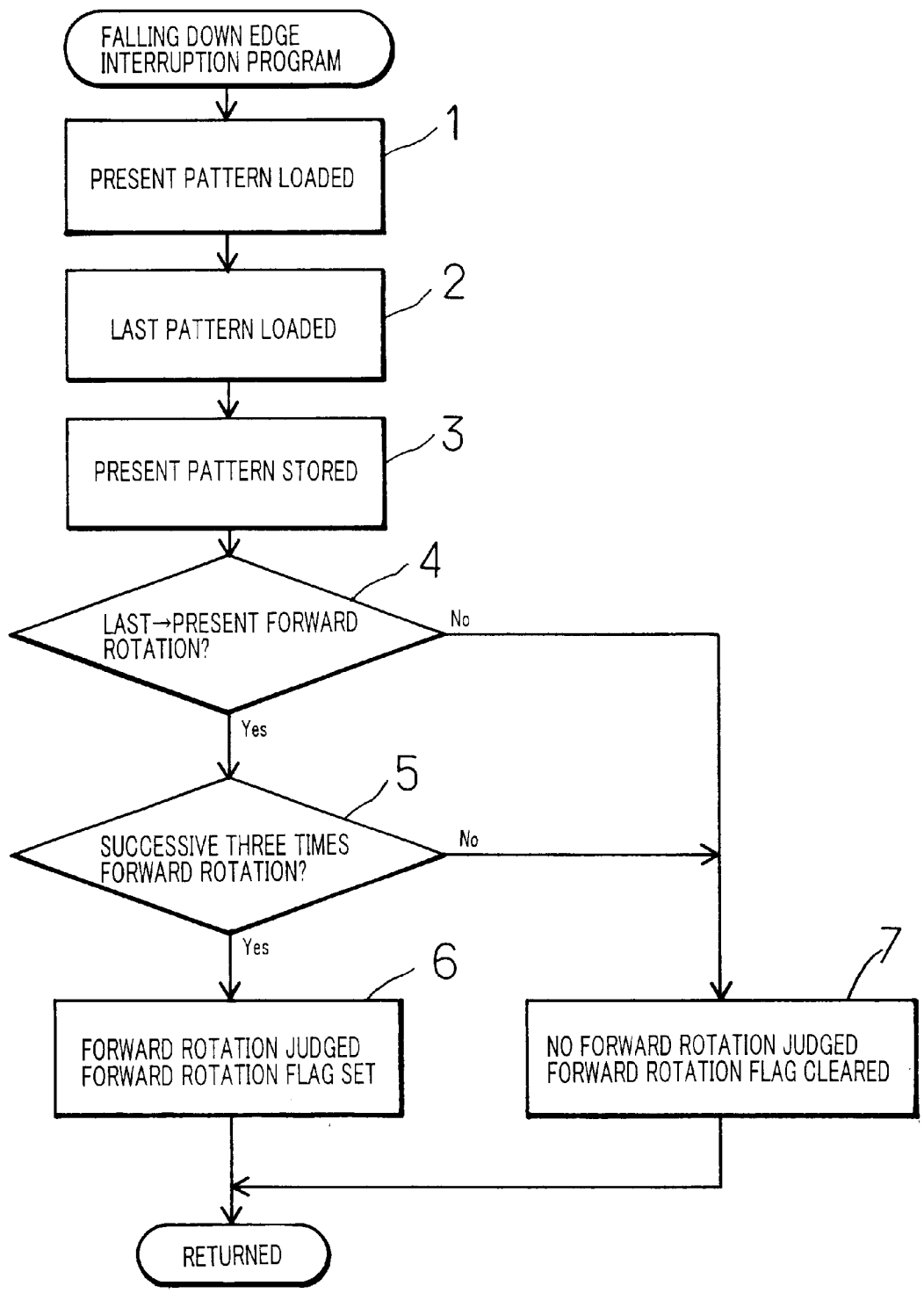
FIG. 8 illustrates a flow chart of an example of an algorithm practiced by a computer to form rotation state judgment means used in the second embodiment of the invention.

The microprocessor 11 practices the routine shown in FIG. 8 whenever the interruption signal generation circuit 13 detects the edge of the falling down of the outputs of the position sensors hu through hw and generates the interruption signal IN2 in order to accomplish the above-mentioned rotation state judging means.

As the interruption signal IN2 is generated at the edge of the falling down of the outputs of the position sensors hu through hw, there is practiced at first the step 1 of FIG. 8 where the output pattern of the position sensors when the edge of this falling down of the outputs of the position sensors is detected is loaded in a data processing memory. Thereafter, the program is transferred to the step 2 where the output pattern of the position sensors stored in the position sensor pattern memory when the edge of the falling down of the last output of the position sensors is detected is loaded in the data processing memory and to the step 3 where the output patter of the position sensors detected at this time is stored in the position sensor pattern memory.

Thereafter, in the step 4, the output pattern of the position sensors detected when the last interruption signal IN2 is generated is compared with the output pattern of the position sensors detected when the present interruption signal IN2 is generated. While the electric motor is rotating in the forward direction, whenever the interruption signal IN2 is generated as shown in FIG. 6E (whenever the falling edge of the outputs of the position sensors hu through hw is detected), the output pattern of the position sensors changes as indicated by (100), (001), (010), (100), - - - . Since the order of the change of these output patterns of the position sensors was already decided, whether the electric motor rotates in the forward direction or not can be judged by comparing the output pattern of the position sensors detected when the last interruption signal IN2 is generated with the output pattern of the position sensors detected when the present interruption signal IN2 is generated.

With the result that whether the electric motor rotates in the forward direction or not is judged in the step 4, when it is judged that it rotates in the forward direction, the program is transferred to the step 5 where whether it is judged three times in succession that the electric motor rotates in the forward direction or not is judged. As a result, when the rotation of the electric motor in the forward direction is judged three times in succession, the program is transferred to the step 6 where a forward rotation flag indicating that it is judged that the electric motor rotates in the forward direction is set and thereafter the program is returned to the main routine.

It is not judged in the step 4 that the electric motor rotates in the forward direction, or it is not judged in the step 5 that the forward rotation of the electric motor is judged three times in succession, the program is transferred to the step 7 where it is decided that the electric motor does not rotate in the forward direction and the forward rotation flag is cleared.

When based on the algorithm shown in FIG. 8, position sensor output pattern storage means to express each output of n position sensors with 1 or 0 whenever the rising up or falling down of the outputs of the position sensors is detected and to memorize the combination of the outputs of the n position sensors as a position sensor output pattern is accomplished by the steps 1 and 3.

Position sensor output pattern judgment means to compare the position sensor output pattern stored last time in the position sensor output pattern storage means with that memorized this time whenever the rising up or falling down of the outputs of the position sensors is detected to judge whether the change of the position sensor output pattern is the one on the forward rotation of the electric motor or not is accomplished by the steps 1, 2 and 4.

Rotational direction judgment means to judge that the electric motor rotates in the forward direction when it is judged m times (m is two or more integers) in succession by the position sensor output pattern judgment means that the position sensor output pattern is changed when the electric motor rotates in the forward direction and to judge that the electric motor does not rotate when it is judged by the position sensor output pattern judgment means that the change of the position sensor output pattern is not the one on the forward rotation of the electric motor or when the number of times of the judgment that the change of the position sensor output pattern is the one on the forward rotation of the electric motor is less than "m" is accomplished by the steps 5 through 7.

Rotation state judgment means to judge whether the electric motor rotates in the forward directions or not is constituted by using the difference of the combination of the output states of n position sensors between the forward rotation of the electric motor and the reverse rotation thereof and when it rotates in the reverse direction with the position sensor output pattern storage means, the position sensor output pattern judgment means and the rotation direction judgment means.

Lock state judgment means judges that the electric motor is in the lock mode when the conditions "a" and "b" indicated below are satisfied.

a. The state where it is judged by the rotation state judgment means that the electric motor 1 rotates in the forward direction while the accelerator opening degree detected by the acceleration sensor 12 is equal to or more than the lock judgment opening degree (or that the forward rotation flag is set) and the rotational speed detected on the time data from each of the rising up (or the falling down) of the outputs of the position sensors hu through hw to the next rising up (or the next falling down) thereof is equal to or less than the set lock start judgment rotational speed continues for the set lock start judgment time.

b. The state where it is judged by the rotation state judgment means that the electric motor 1 does not rotate in the forward direction while the accelerator opening degree is equal to or more than the lock judgment opening degree continues for the set lock start judgment time.

The lock state judgment means judges that the lock mode of the electric motor is released when the conditions "c" and "d" indicated below are satisfied.

c. The accelerator opening degree gets less than the lock judgment opening degree.

d. The state where the rotational speed is equal to or more than the lock release rotational speed which is higher than the lock start rotational speed continues for the set lock release judgment time.

In order to realize the aforementioned lock state judgment means, an example of the flow chart showing the algorithm of the routine practiced by the microprocessor 11 every predetermined time is shown in FIG. 9.

According to the algorithm shown in FIG. 9 in the step 1 at first, whether the accelerator opening degree θa detected by the accelerator sensor 12 is equal to or more than the lock judgment opening degree θL or not is judged. In the case where it is judged that the accelerator opening degree θa is equal to or more than the lock judgment opening degree θL, the program is advanced to the step 2 where whether it is judged that the present state is the lock state or not is judged. When it is judged that the present state is not the lock state, the program is advanced to the steps 3 where whether the forward rotation flag is set or not is judged. As a result, when the forward rotation flag is set, the program is advanced to the step 4 where whether the present rotational speed N of the electric motor is equal to or less than the lock start judgment rotational speed NLS or not is judged. When the present rotational speed N of the electric motor is equal to or less than the lock start judgment rotational speed NLS, the program is advanced to the step 5 where whether the state where the accelerator opening degree is equal to or more than the lock judgment angle and the rotational speed N is equal to or less than the lock start judgment rotational speed NLS continues for the lock start judgment time tLS or not is judged. As the result of the judgment, when it is judged that the state where the accelerator opening degree is equal to or more than the lock judgment angle and the rotational speed N is equal to or less than the lock start judgment rotational speed NLS continues for the lock start judgment time tLS, the program is advanced to the step 6 where the conclusion of judgment that the electric motor is in the lock mode is drawn and returned to the main routine. In the step 3, when it is judged that the forward rotation flag is not set (when it is judged by the rotation state judgment means realized by the routine of FIG. 8 that the electric motor does not rotate in the forward direction), the program is advanced over the step 4 to the step 5 where whether the time during which it is judged that the accelerator opening degree θa is equal to or more than the lock judgment opening degree θL and that the electric motor does not rotate in the forward direction continues during the lock start judgment time tLS or not is judged. As the result of the judgment, it is judged that the time during which it is judged that the accelerator opening degree θa is equal to or more than the lock judgment opening degree θL and that the electric motor does not rotate in the forward direction continues for the lock start judgment time tLS, the program is advanced to the step 6 where it is judged that the electric motor is in the lock mode at present and returned to the main routine.

In the step 1 of FIG. 9, when it is judged that that the accelerator opening degree θa is less than the lock judgment opening degree θL, the program is advanced to the step 7 where the lock mode of the electric motor is released and thereafter the program is returned to the main routine. When it is judged in the step 4 that the rotational speed N is higher than the lock start judgment rotational speed NLS or when it is judged in the step 5 that the time during which it is judged that the accelerator opening degree θa is equal to or more than the set lock judgment opening degree θL and that the electric motor does not rotate does not continue for the lock start judgment time tLS, the program is advanced to the step 8 where the lock mode is released.

In the step 2, when the lock state is judged at present, the program is advanced to the step 9 where whether the forward rotation flag is set or not is judged. As a result, when it is judged that the forward rotation flag is set, the program is advanced to the step 10 where whether the rotational speed N is equal to or more than the lock release rotational speed NLC set at a value higher than the lock start judgment rotational speed NLS or not is judged. As the result of the judgment, when it is judged that the rotational speed N is equal to or more than the lock release rotational speed NLC, the program is advanced to the step 11 in which whether the state where it is judged that the electric motor rotates in the forward direction in the condition where the lock state is judged and also it is judged that the rotational speed is equal to or more than the lock release rotational speed NLC continues for the lock release judgment time tLC set at a value longer than the lock start judgment time tLS or not is judged. As a result, when the state where it is judged that the electric motor rotates in the forward direction in the condition where the lock state is judged and also it is judged that the rotational speed is equal to or more than the lock release rotational speed NLC continues for the lock release judgment time tLC, the program is advanced to the step 12 where the lock mode is released.

When it is judged in the step 2 that the electric motor is now in the lock mode and in the state where it is judged in the step 9 that the electric motor rotates in the forward direction, it is judged in the step 10 that the rotational speed N is lower than the lock release rotational speed NLC or when it is judged in the step 2 that the electric motor is now in the lock mode and in the state where it is judged that the electric motor rotates in the forward direction, it is judged in the step 11 that the time tLC does not elapse after the rotational speed N gets equal to or more than the lock release rotational speed NLC, the lock mode is maintained in the step 13 and then the program is returned to the main routine.

When it is judged that the forward rotation flag is not set in the state where it is judged in the step 2 that the electric motor is in the lock mode, the program is advanced over the step 10 to the step 11 where whether the lock release judgment time tLC elapses after it is judged that the forward rotation flag is not set (or after it is judged that the electric motor rotates in the reverse direction) or not is judged. As a result, when it is judged that the lock release judgment time tLC elapses after it is judged that the forward rotation flag is not set (or when the state where it is judged that the electric motor rotates in the reverse direction continues during the lock release judgment time in the condition where the lock state is judged), the program is advanced to the step 12 where the lock mode is released.

In other words, in the state where the electric motor rotates in the reverse direction continues during the predetermined time, the current flows through the armature coils of respective phases equally. Thus, since the state where the current flows only through the armature coil of particular phase is cancelled, the lock mode is released.

According to the algorithm of FIG. 9, the accelerator opening degree judgment means to judge whether the accelerator opening degree θa is equal to or more than the lock judgment opening degree θL is constituted by the step 1 and the lock mode confirmation means to confirm whether the judgment of the lock mode is already performed or not when it is judged by the accelerator opening degree judgment means that the accelerator opening degree is equal to or more than the lock judgment opening degree Unlock-mode-time rotational direction confirmation means to confirm whether it is judged or not by the rotation state judgment means that the electric motor rotates in the forward direction when it is judged by the lock mode confirmation means that the lock mode is not yet judged is constituted by the step 3 and unlock-time rotational speed judgment means to judge whether the rotational speed of the electric motor is equal to or less than the lock start rotational speed or not when it is confirmed by the unlock-mode-time rotational speed confirmation means that it is judged that the electric motor rotates in the forward direction is constituted by the step 4.

Lock-start-time lapse time judgment means to judge whether the set lock start judgment time elapses or not after there arises the state where it is judged by the unlock-time rotational speed judgment means that the rotational speed is equal to or less than the lock start rotational speed or where it is judged by the first rotational direction confirmation means that the electric motor does not rotate in the forward direction is constituted by the step 5. Lock-mode-time rotational direction confirmation means to confirm whether it is judged or not by the rotation state judgment means that the electric motor rotates in the forward direction when it is confirmed by the lock mode confirmation means that the lock mode is already judged is constituted by the step 9.

Lock-time rotational speed judgment means to judge whether the rotational speed of the electric motor is equal to or more than the lock release rotational speed set at the value higher than the lock start rotational speed when it is confirmed by the lock mode rotational direction confirmation means (the step 9) that the judgment in which the electric motor rotates in the forward direction is made is constituted by the step 10. Lock-release-time lapse time judgment means to judge whether the set lock release judgment time elapses or not after there arises the state where it is confirmed by the lock-time rotational direction confirmation means that the judgment in which the electric motor does not rotate is made or the state where it is judged by the lock time rotational speed judgment means that the rotational speed is equal to or more than the lock release rotational speed is constituted by the step 11.

First lock mode judgment means is constituted by the step 6, and second lock mode judgment means is constituted by the step 13. The first lock mode judgment means judges that the electric motor is in the lock mode when it is judged by the lock-start-time lapse time judgment means that the lock start judgment time elapses, while the second lock mode judgement means judges that the electric motor is still in the lock mode when it is judged by the lock-time rotational speed judgment means that the rotational speed is less than the lock release rotational speed or when it is judged by the lock-release-time lapse time judgment means that the lock release lapse time does not elapse.

First lock mode release means to judge that the lock mode is released when it is judged by the accelerator opening degree judgment means that the accelerator opening degree is less than the lock start judgment opening degree is realized by the step 7 while second lock mode release means to judge that the lock mode is released when it is judged by the unlock-time rotational speed judgment means that the rotational speed exceeds the lock start rotational speed or when it is judged by the lock-start-time lapse time judgment means that the lock start judgment time does not elapse is realized by the step 8.

Third lock mode release means to judge that the lock mode is released when it is judged by the lock-release-time lapse time judgment means that the lock release judgment time elapses is constituted by the step 12. Lock state judgment means is composed of the accelerator opening degree judgment means, the lock mode confirmation means, the unlock-mode-time rotational direction confirmation means, the unlock-time rotational speed judgment means, the lock-start-time lapse time judgment means, the lock-mode-time rotational direction confirmation means, the lock-time rotational speed judgment means, the lock-release-time lapse time judgment means, the first and second lock mode judgment means and the first through third lock mode release means.

The lock-time drive current control means limits the duty factor of the PWM signal Vpwm to a smaller value when it is judged by the lock state judgment means that the electric motor is in the lock mode to control the drive current so as to limit the maximum value of the drive current supplied to the armature coils Lu through Lw to the value equal to or less than the lock-time limit value and releases the drive current limit control when it is judged that the lock state is released to return the control mode at the steady state time in which the duty factor is controlled in accordance with the accelerator opening degree and the rotational speed.

In the present embodiment, in order to prevent an unnecessary shock arising due to variation in the drive current, when the drive current limit control should be made, the drive current is preferably limited so that it is gradually reduced from the steady-state-time value to the lock-time limit value for a certain time and when the drive current restriction control should be released, it is preferably done so that the drive current is gradually increased from the lock-time limit value to the steady-state value for a certain time.

According to the second embodiment, since there are provided the rotation state judgment means to judge whether the electric motor rotates in the forward direction or not and the lock state judgment means to judge that the electric motor is in the lock mode when the state where it is judged by the rotation state judgment means that the electric motor rotates in the forward direction while the accelerator opening degree is equal to or more than the lock judgment opening degree continues for the set lock start judgment time or when the state where it is judged that the electric motor does not rotate in the forward direction while the accelerator opening degree is equal to or more than the lock judgment opening degree continues for the set lock start judgment time, the lock state is judged in spite of the time data when the hunting arises so that the rotational direction is reversed at the time of extremely low speed of the electric motor so that the drive current can be limited. Thus, even when the state where the large drive current flows through the armature coil of particular phase continues, the armature coils can be positively protected.

Although, in the aforementioned embodiments, the drive current of PWM waveform is obtained by turning on or off the lower side switch elements Fx through Fz of the switch circuit 10, it may be obtained by turning on or off the upper side switch elements Fu through Fw or by turning on or off both of the upper side switch elements Fu through Fw and the lower side switch elements Fx through Fz.

Although, in the aforementioned embodiments, the Hall effect element IC forming each of the position sensors is displaced at the position advanced 90 degree relative to the center of the teeth part on which the armature coil of each phase is wound, the position where the position sensors are displaced is not limited thereto so long as the rotational angle position of the magnetic poles of the rotor relative to the armature coil of each phase can be detected.

Although, in the aforementioned embodiments, the 180 degree switching control is made, the brushless DC motor may be driven by any other means. For instance, there may be performed "120 degree switching control" in which the drive current flows through the armature coil of each phase for a distance (an electrical angle) of 60 degree in front of and behind the position where the magnetic flux passes the zero point through the teeth part on which the armature coil of each phase is wound and the invention may be applied to the control system for the electric motor which rotates according to the 120 degree switching control.

Although, in the aforementioned embodiments, the magnetic poles of the rotor are directly detected by the Hall effect element IC which is used as the position sensors, a rotational angle position detecting magnet magnetized in the same manner as the magnetic poles of the rotor in the form of ring may be attached onto the rotor separately from the magnetic poles whereby the magnetic poles of the rotor may be indirectly detected by detecting the magnetic poles of the rotational angle position detecting magnet by the Hall effect element IC. The position sensors such as a photo encoder may be used in place of the Hall effect element IC.

The electric vehicle to which the invention is applied may be in the form of one adapted to transmit the output of the electric motor directly to the driving wheel of the vehicle or indirectly thereto through a reduction gear.

Although, in the aforementioned embodiments, the three-phase brushless electric motor is used, the electric motor used may have the armature coils of two or more phases.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. A control system for an electric motor for driving an electric vehicle while an output of said electric motor is controlled on an accelerator opening degree corresponding to a displacement quantity of an accelerator operation member, said control system comprising an acceleration sensor to output an acceleration signal having a magnitude corresponding to said accelerator opening degree by detecting said accelerator opening degree; rotational speed detection means to detect a rotational speed of said electric motor; steady-state-time drive current control means to control a drive current of said electric motor in accordance with said acceleration signal; lock state judgment means to judge that said electric motor is in the lock state when the state where said rotational speed detected by said rotational speed detection means is equal to or less than a set lock start rotational speed while said accelerator opening degree detected from said acceleration signal is equal to or more than a set lock judgment opening degree continues during a set lock start judgment time and to judge that said lock state is released when the state where said accelerator opening degree is less than said lock judgment opening degree or the state where said rotational speed is equal to or more than a lock release rotational speed set at a value higher than said lock start rotational speed continues for a set lock release judgment time; and lock-time drive current control means to perform a drive current limit control in which said drive current is reduced from a value determined by said steady-state-time drive current control means to a lock-time limit value so as to limit the maximum value of said drive current to a value equal to or less than the lock-time limit value when it is judged by said lock state judgment means that the electric motor is in the lock state and to release said drive current limit control whereby said drive current is increased from said value equal to or less than said lock-time limit value to said value determined by said steady-state-time drive current control means when it is judged that said lock state is released.

2. A control system for an electric motor for driving an electric vehicle as set forth in claim 1 and wherein when said drive current limit control is made, said drive current is gradually reduced over a lock start control time from the value determined by said steady-state-time drive current control means to said lock-time limit value and when said drive current limit control is released, said drive current is gradually increased over a lock release control time from said lock-time limit value to said value determined by said steady-state-time drive current control means.

3. A control system for an electric motor for driving a brushless DC electric vehicle including a rotor having a field system and a stator having armature coils of n phases (n is two or more integers) while an output of said electric motor is controlled on an accelerator opening degree corresponding to a displacement quantity of an accelerator operation member, said control system comprising an acceleration sensor to output an acceleration signal having a magnitude corresponding to said accelerator opening degree by detecting said accelerator opening degree; rotational speed detection means to detect a rotational speed of said electric motor; n position sensors to generate an output having a level varying whenever a polarity of magnetic poles directly or indirectly detected by said magnetic poles of said rotor relative to armature coils of n phases of said stator, respectively changes; a switch circuit provided between a DC power supply and said armature coils to switch the phase of the armature coil through which a drive current flows from said DC power supply; steady-state-time drive current control means having duty factor arithmetical operation means to arithmetically operate a duty factor of said drive current for said acceleration signal and switch control means to control said switch circuit so that there flows through the armature coil of phase determined in accordance with an output of said position sensors the drive current of PWM waveform intermittent in the duty factor arithmetically operated by said duty factor arithmetical operation means whereby said rotor rotates; lock state judgment means to judge that said electric motor is in the lock state when the state where said rotational speed detected by said rotational speed detection means is equal to or less than a set lock start rotational speed while said accelerator opening degree detected from said acceleration signal is equal to or more than a set lock judgment opening degree continues for a set lock start judgment time and to judge that said lock state is released when the state where said accelerator opening degree is less than said lock judgment opening degree or the state where said rotational speed is equal to or more than a lock release rotational speed set at a value higher than said lock start rotational speed continues for a set lock release judgment time; and lock-time drive current control means to perform a drive current limit control in which said duty factor of said drive current is reduced from a value arithmetically operated by said duty factor arithmetical operation means to a lock-time limit duty factor so that the maximum value of said drive current is limited to the value equal to or less than said lock-time limit value when it is judged by said lock state judgment means that the electric motor is in the lock state and to release said drive current limit control whereby said duty factor of said drive current is increased from said lock-time limit value to said value determined by said duty factor arithmetical operation means when it is judged that said lock state is released.

4. A control system for an electric motor for driving an electric vehicle as set forth in claim 3 and wherein said lock-time drive current control means to gradually reduce said duty factor of said drive current over a set lock start control time from the value arithmetically operated by said duty factor arithmetical operation means to said lock-time limit duty factor when said drive current limit control is made and to gradually increase said duty factor of said drive current over a set lock release control time from said lock-time limit value to said value arithmetically operated by said duty factor arithmetical operation means when said drive current limit control is released.

5. A control system for an electric motor for driving an electric vehicle as set forth in claim 3 or 4 and further comprising a temperature sensor to detect a temperature of switch elements of said switch circuit and switch circuit protection control means to control said duty factor of said drive current so as to limit said duty factor of said drive current to a value equal to or less than a previously set limit value in spite of a result of judgment of said lock state judgment means when the temperature detected by said temperature sensor exceeds an allowable value.

6. A control system for an electric motor for driving a brushless DC electric vehicle including a rotor having a field system and a stator having armature coils of n phases (n is two or more integers) while an output of said electric motor is controlled on an accelerator opening degree corresponding to a displacement quantity of an accelerator operation member, said control system comprising an acceleration sensor to output an acceleration signal having a magnitude corresponding to said accelerator opening degree by detecting said accelerator opening degree; rotational speed detection means to detect a rotational speed of said electric motor; n position sensors to generate an output having a level varying whenever a polarity of magnetic poles directly or indirectly detected by said magnetic poles of said rotor relative to armature coils of n phases of said stator, respectively changes; a switch circuit provided between a DC power supply and said armature coils to switch the phase of the armature coil through which a drive current flows from said DC power supply; steady-state-time drive current control means having duty factor arithmetical operation means to arithmetically operate a duty factor of said drive current on said acceleration signal and switch control means to control said switch circuit so that there flows through the armature coil of phase determined in accordance with an output of said position sensors the drive current of PWM waveform intermittent in the duty factor arithmetically operated by said duty factor arithmetical operation means whereby said rotor rotates; rotation state judgment means to judge whether said electric motor rotates in the forward direction or not by using the difference of a combination of output states of said n position sensors between the forward rotation of said electric motor and the reverse rotation thereof; lock state judgment means to perform every predetermined time the judgment that said electric motor is in the lock state when the state where it is judged by said rotation state judgment means that said electric motor rotates in the forward direction and said rotational speed is equal to or less than a set lock start rotational speed while said accelerator opening degree detected from said acceleration signal is equal to or more than a set lock judgment opening degree continues for a set lock start judgment time or when it is judged that said electric motor does not rotate in the forward direction while said accelerator opening degree is equal to or more than said lock judgment opening degree continues for a set lock start judgment time and the judgment that said lock state is released when the state where said accelerator opening degree is less than said lock judgment opening degree or the state where said rotational speed is equal to or more than a lock release rotational speed set at a value higher than said lock start rotational speed continues for a set lock release judgment time; and lock time drive current control means to perform a drive current limit control in which the maximum value of said drive current is reduced to a value equal to or less than a lock-time limit value when it is judged that the electric motor is in the lock state and to release said drive current limit control when it is judged that said lock state is released.

7. A control system for an electric motor for driving an electric vehicle as set forth in claim 6 and wherein said rotation state judgment means judges whether said electric motor rotates in the forward direction or not whenever a rising up or a falling down of the output of each of said position sensors is detected.

8. A control system of an electric motor for driving an electric vehicle as set forth in claim 6 and wherein said rotation state judgment means comprises position sensor output pattern storage means to store as a position sensor output pattern a combination of the outputs of said n position sensors which are expressed by "0" or "1" whenever a rising up or a falling down of said outputs of said position sensors is detected; position sensor output pattern judgment means to judge whether the change of the output pattern of said position sensors corresponds to that when said electric motor rotates in the forward direction or not by comparing the last output pattern of said position sensors stored in said position sensor output pattern storage means with the present output pattern of said position sensors stored therein whenever the rising up or the falling down of said outputs of said position sensors is detected; and rotational direction judgment means to judge that said electric motor rotates in the forward direction when it is judged by said position sensor output pattern judgment means m times ("m" is two or more integers) in succession that the change of said position sensor output pattern is the one when said electric motor rotates in the forward direction and to judge that said electric motor does not rotate in the forward direction when it is judged by said position sensor output pattern judgment means that the change of said position sensor output pattern is not the one when said electric motor rotates in the forward direction or when it is judged less than m times that the change of said position sensor output pattern is the one when said electric motor rotates in the forward direction.

9. A control system for an electric motor for driving an electric vehicle as set forth in claim 6 or 8 and wherein said lock state judgment means comprises accelerator opening degree judgment means to judge whether said accelerator opening degree is equal to or more than a lock judgment opening degree or not; lock mode confirmation means to confirm whether the judgment of the lock mode is already made or not when it is judged by said accelerator opening degree judgment means that said accelerator opening degree is equal to or more than said lock judgment opening degree; unlock mode time rotational direction confirmation means to confirm that whether said electric motor rotates in the forward direction or not is judged by said rotation state judgment means when it is judged by said lock mode confirmation means that said judgment of lock mode is not yet made; unlock-time rotational speed judgment means to judge whether said rotational speed of said electric motor is equal to or less than said lock start rotational speed when it is confirmed by said unlock-mode-time rotational direction confirmation means that the judgment of the forward rotation of said electric motor is made; lock-start-time lapse time judgment means to judge whether a set lock start judgment time elapses or not after the state where it is judged by said unlock-time rotational speed judgment means that said rotational speed is equal to or less than said lock start rotational speed or the state where it is judged by said first rotational direction confirmation means that said electric motor does not rotate in the forward direction arises; lock-mode-time rotational direction confirmation means to confirm whether it is judged or not by said rotation state judgment means that said electric motor rotates in the forward direction is judged when it is confirmed by said lock mode confirmation means that the judgment of lock mode is already made; lock-time rotational speed judgment means to judge whether the rotational speed of said electric motor is equal to or more than the lock release rotational speed set at the value higher than said lock start rotational speed or not when it is confirmed by said lock-mode-time rotational direction confirmation means that the judgment of the forward rotation of said electric motor is made; lock-release-time lapse time judgment means to judge whether the set lock release judgment time elapses or not after the state where it is confirmed by said lock-time rotational direction confirmation means that it is judged that the electric motor does not rotate in the forward direction or the state where it is judged by said lock-time rotational speed judgment means that said rotational speed is equal to or more than said lock release rotational speed arises; first lock mode judgment means to judge that said electric motor is in the lock mode when it is judged by said lock-start-time lapse time judgment means that said lock-start-time judgment time elapses; second lock mode judgment means to judge that said electric motor is still in the lock mode when it is judged by said lock-time rotational speed judgment means that said rotational speed is less than said lock release rotational speed or when it is judged by said lock-release-time lapse time judgment means that said lock release judgment time does not elapse; first lock mode release means to judge the release of said lock mode when it is judged by said accelerator opening degree judgment means that said accelerator opening degree is less than said lock judgment opening degree; second lock mode release means to judge the release of said lock mode when it is judged that by said unlock-time rotational speed judgment means that said rotational speed exceeds said lock start rotational speed or when it is judged by said lock start-lapse-time lapse time judgment means that said lock start judgment time does not elapse; and third lock mode release means to judge the release of said lock mode when it is judged by said lock-release-time lapse time judgment means that said lock release judgment time elapses.

* * * * *

UNITED STATES PATENT AND TRADEMARK OFFICE
CERTIFICATE OF CORRECTION

PATENT NO. : 6,647,325 B2
DATED : November 11, 2003
INVENTOR(S) : Shimazaki et al.

It is certified that error appears in the above-identified patent and that said Letters Patent is hereby corrected as shown below:

Title page,
Item [75], Inventors, delete "Yutaka Inaba, Nunazu (JP)" and insert -- Yutaka Inaba, Numazu (JP) --.

Column 16,
Line 20, delete "advance d" and insert -- advanced --.
Line 26, delete "perform ed" and insert -- performed --.

Column 27,
Line 41, delete "more than the lock judgement opening degree Unlock-mode" and insert -- more than the lock judgement opening degree.
        Unlock-mode --.

Signed and Sealed this

Fourth Day of May, 2004

JON W. DUDAS
*Acting Director of the United States Patent and Trademark Office*